US009933947B1

United States Patent
Vokaliga et al.

(10) Patent No.: US 9,933,947 B1
(45) Date of Patent: Apr. 3, 2018

(54) MAINTAINING WRITE CONSISTENCY ON DISTRIBUTED MULTIPLE PAGE WRITES

(71) Applicant: EMC IP Holding Company LLC, Hopkinton, MA (US)

(72) Inventors: Deepak Vokaliga, Hopkinton, MA (US); Benjamin Yoder, Westborough, MA (US); Vadim Longinov, Marlborough, MA (US); George Quill, Rindge, NH (US); Benoit Joseph Merlet, Chelmsford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/984,376

(22) Filed: Dec. 30, 2015

(51) Int. Cl.
*G06F 3/06* (2006.01)
*G06F 12/08* (2016.01)
*G06F 12/0802* (2016.01)

(52) U.S. Cl.
CPC .............. *G06F 3/061* (2013.01); *G06F 3/065* (2013.01); *G06F 3/0638* (2013.01); *G06F 3/0671* (2013.01); *G06F 12/0802* (2013.01); *G06F 2212/1016* (2013.01); *G06F 2212/60* (2013.01)

(58) Field of Classification Search
CPC ........ G06F 3/061; G06F 3/0638; G06F 3/065; G06F 3/0671; G06F 12/0802; G06F 2212/1016; G06F 2212/60; G06F 11/2069; G06F 11/2071; G06F 17/30067; G06F 2201/82; G06F 2212/286; G06F 9/467; G06F 2221/0795
See application file for complete search history.

(56) References Cited

U.S. PATENT DOCUMENTS

| 5,544,347 A * | 8/1996 | Yanai .................... G06F 3/0601 711/162 |
| 5,551,046 A * | 8/1996 | Mohan ....................... G06F 9/52 |
| 5,742,792 A | 4/1998 | Yanai et al. |

(Continued)

OTHER PUBLICATIONS

U.S. Appl. No. 14/982,218, filed Dec. 29, 2015, entitled Multi-Site Block Level Write Consistency, Vokaliga, et al.

*Primary Examiner* — Mano Padmanabhan
*Assistant Examiner* — Patrick Borges
(74) *Attorney, Agent, or Firm* — Muirhead and Saturnelli, LLC

(57) ABSTRACT

Techniques are described for processing multi-page write operations to maintain write level consistency. A multi-page write spanning multiple cache pages is directed to a target device and received on a first data storage system where writes to the target device are synchronously replicated to a second data storage system. On the first data storage system, each of the multiple cache pages may be synchronously replicated to the second data storage system. A lock on each of the cache pages is not released until an acknowledgement is received regarding successful replication of the cache page. On the second data storage system, requests to replicate the multiple cache pages containing write data of the multi-page write are received and processed using locks of corresponding cache pages on the second data storage system. Such techniques also handle concurrent reads and/or writes. Deadlock detection and resolution processing may be performed for concurrent writes.

14 Claims, 20 Drawing Sheets

(56) References Cited

U.S. PATENT DOCUMENTS

| | | | | |
|---|---|---|---|---|
| 6,516,384 | B1* | 2/2003 | Clark | G06F 12/126 |
| | | | | 711/109 |
| 6,721,739 | B1* | 4/2004 | Mende, Jr. | G06F 17/30371 |
| 6,968,369 | B2 | 11/2005 | Veprinsky et al. | |
| 7,054,883 | B2* | 5/2006 | Meiri | G06F 17/30067 |
| 8,327,187 | B1* | 12/2012 | Metcalf | G06F 13/4221 |
| | | | | 714/10 |
| 8,335,899 | B1* | 12/2012 | Meiri | G06F 11/2069 |
| | | | | 711/162 |
| 9,323,682 | B1* | 4/2016 | Marshak | G06F 12/0866 |
| 2004/0111422 | A1* | 6/2004 | Devarakonda | G06F 9/526 |
| 2008/0177954 | A1* | 7/2008 | Lee | G06F 12/126 |
| | | | | 711/154 |
| 2011/0258376 | A1* | 10/2011 | Young | G06F 12/0804 |
| | | | | 711/113 |
| 2014/0181579 | A1* | 6/2014 | Whitehead | G06F 17/30289 |
| | | | | 714/15 |

* cited by examiner

MAINTAINING WRITE CONSISTENCY ON DISTRIBUTED MULTIPLE PAGE WRITES

BACKGROUND

Technical Field

This application generally relates to data storage.

Description of Related Art

Systems may include different resources used by one or more host processors. Resources and host processors may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the logical volumes allows the host systems to share data stored therein.

SUMMARY OF THE INVENTION

In accordance with one aspect of the invention is a method of processing I/O operations comprising: receiving, from a host, a first write at a first data storage system, wherein the first write is a request to write first data to a target location on a target device and the first data is stored in a first plurality of cache pages; performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page; performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system. The method may include returning an acknowledgment to the host regarding completion of the first write responsive to receiving the plurality of acknowledgements from the second data storage system. The first plurality of cache pages may have a sequential ordering and the second plurality of corresponding cache pages may have the sequential ordering. The second processing may include receiving a first replication request to synchronously replicate one of the first plurality of cache pages of the first data storage system to a corresponding cache page of the second plurality of cache pages of the second data storage system; determining whether the one cache page is a first cache page of the sequential ordering; and if the one cache page is the first cache page of the sequential ordering, performing processing including locking said corresponding cache page, storing data from the one cache page in the corresponding cache page of the second plurality of cache pages, and returning an acknowledgement to the first data storage system regarding successful synchronous replication of the one cache page. If the one cache page is not the first cache page of the sequential ordering, performing third processing may include locking said corresponding cache page; determining whether a second cache page of the second plurality of cache pages on the second data storage system is locked, the second cache page having a position in the sequential ordering immediately prior to said one cache page in the sequential ordering; and if it is determined that the second cache page is locked, performing processing including unlocking the second cache page, storing data from the one cache page in the corresponding cache page of the second plurality of cache pages, and returning an acknowledgement to the first data storage system regarding successful synchronous replication of the one cache page. If the second cache page of the second plurality of cache pages is not locked, additional processing may be performed that may include unlocking said corresponding cache page, waiting for the second cache page to become locked, unlocking the second cache page, storing data from the one cache page in the corresponding cache page, and returning an acknowledgement to the first data storage system regarding successful synchronous replication of the one cache page. The method may include determining whether the one cache page is a last cache page in the sequential ordering; and if it is determined that the one cache page is the last cache page in the sequential ordering, unlocking the corresponding cache page of the second data storage system. The first data storage system may expose a first device to a host over a first path between the host and the first data storage system, and the second data storage system may expose a second device to the host over a second path between the host and the second data storage system. The first device and the second device may be configured as the target device. The host may issue the first write over the first path and the host may issue one or more other I/Os directed to the target device over the second path. The one or more other I/Os may include at least one read directed to the target location of the target device. The one or more other I/Os may include at least a second write directed to the target location of the target device. The second write may write second data spanning multiple cache pages, and wherein processing may be performed to synchronously replicate the second data from the second data storage system to the first data storage system. The method may include performing deadlock detection processing that detects a first conflicting replication request to synchronously replicate a portion of the first data from the first data storage system to the second data storage system, and a second conflicting replication request to replicate a portion of the second data from the second data storage system to the first data storage system, said first data and said second data each mapping to a same location on the target device; and responsive to detecting the first conflicting replication request and the second conflicting replication request, performing resolution processing that selects one of the first conflicting replication request and the second conflicting replication request to proceed prior to the other of the first conflicting replication request and the second conflicting replication request. The method may include processing the first conflicting replication request prior to the second conflicting replication request; and processing the second conflicting replication request after processing the first conflicting replication request.

In accordance with another aspect of the invention is a system comprising a processor; and a memory comprising code stored thereon that, when executed, performs a method of processing I/O operations comprising: receiving, from a host, a first write at a first data storage system, wherein the first write is a request to write first data to a target location on a target device and the first data is stored in a first plurality of cache pages; performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page; performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system.

In accordance with another aspect of the invention is a computer readable medium comprising code stored thereon that, when executed, performs a method of processing I/O operations comprising: receiving, from a host, a first write at a first data storage system, wherein the first write is a request to write first data to a target location on a target device and the first data is stored in a first plurality of cache pages; performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page; performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system. The method may include returning an acknowledgment to the host regarding completion of the first write responsive to receiving the plurality of acknowledgements from the second data storage system. The first plurality of cache pages may have a sequential ordering and the second plurality of corresponding cache pages may have the sequential ordering. The second processing may include receiving a first replication request to synchronously replicate one of the first plurality of cache pages of the first data storage system to a corresponding cache page of the second data storage system; determining whether the one cache page is a first cache page of the sequential ordering; and if the one cache page is the first cache page of the sequential ordering, performing processing including locking said corresponding cache page, storing data from the one cache page in the corresponding cache page of the second plurality of cache pages, and returning an acknowledgement to the first data storage system regarding successful synchronous replication of the one cache page. If the one cache page is not the first cache page of the sequential ordering, third processing may be performed and may include locking said corresponding cache page; determining whether a second cache page of the second plurality of cache pages on the second data storage system is locked, the second cache page having a position in the sequential ordering immediately prior to said one cache page in the sequential ordering; and if it is determined that the second cache page is locked, performing processing including unlocking the second cache page, storing data from the one cache page in the corresponding cache page of the second plurality of cache pages, and returning an acknowledgement to the first data storage system regarding successful synchronous replication of the one cache page. If the second cache page of the second plurality of cache pages is not locked, additional processing may be performed and may include unlocking said corresponding cache page, waiting for the second cache page to become locked, unlocking the second cache page, storing data from the one cache page in the corresponding cache page, and returning an acknowledgement to the first data storage system regarding successful synchronous replication of the one cache page.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
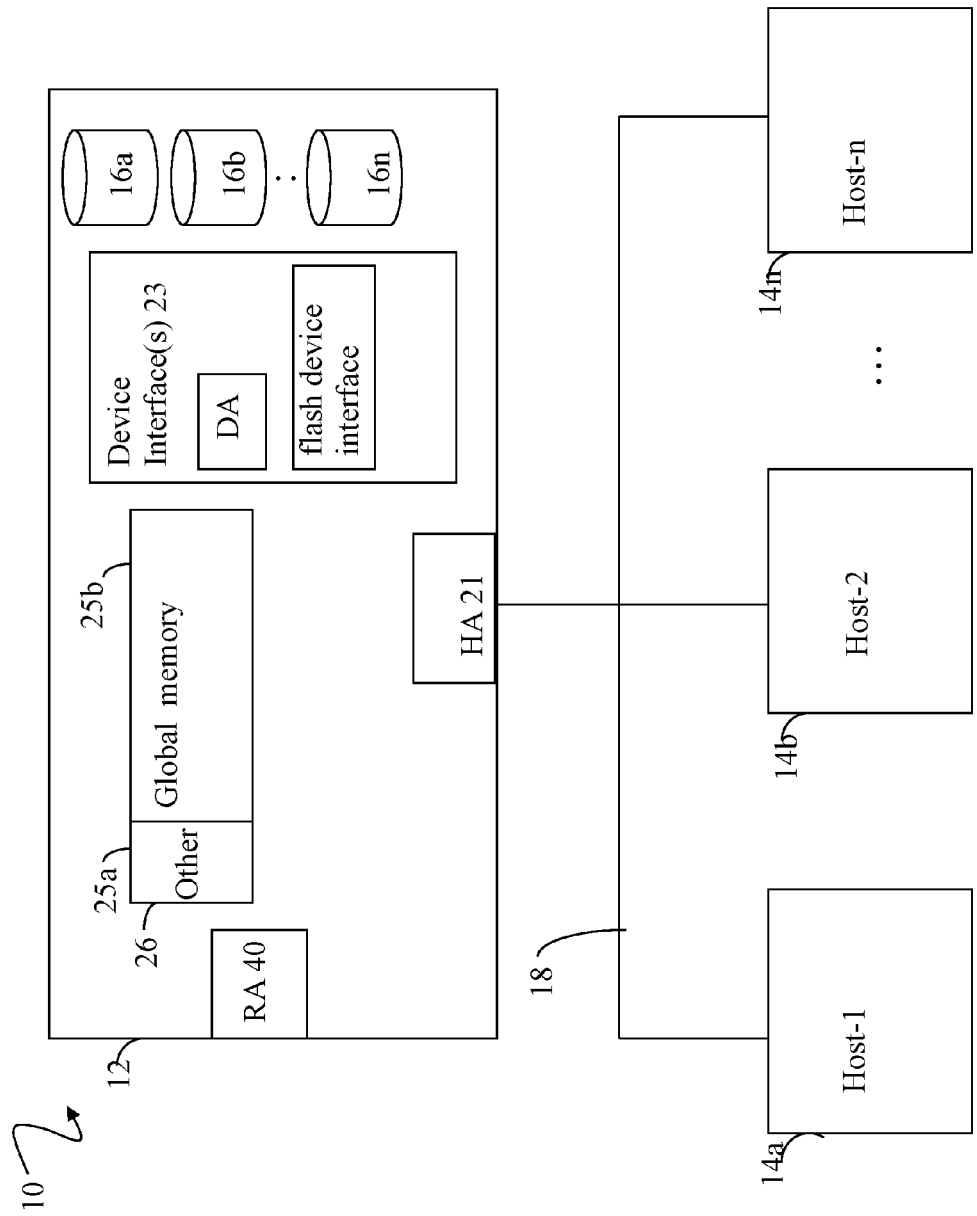
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device. Generally, elements 16a-16n may denote any suitable non-volatile data storage device or medium upon which data may be stored and retrieved.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a rotating disk drive or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs) which may also be referred to as logical units (e.g., LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Figure 2:
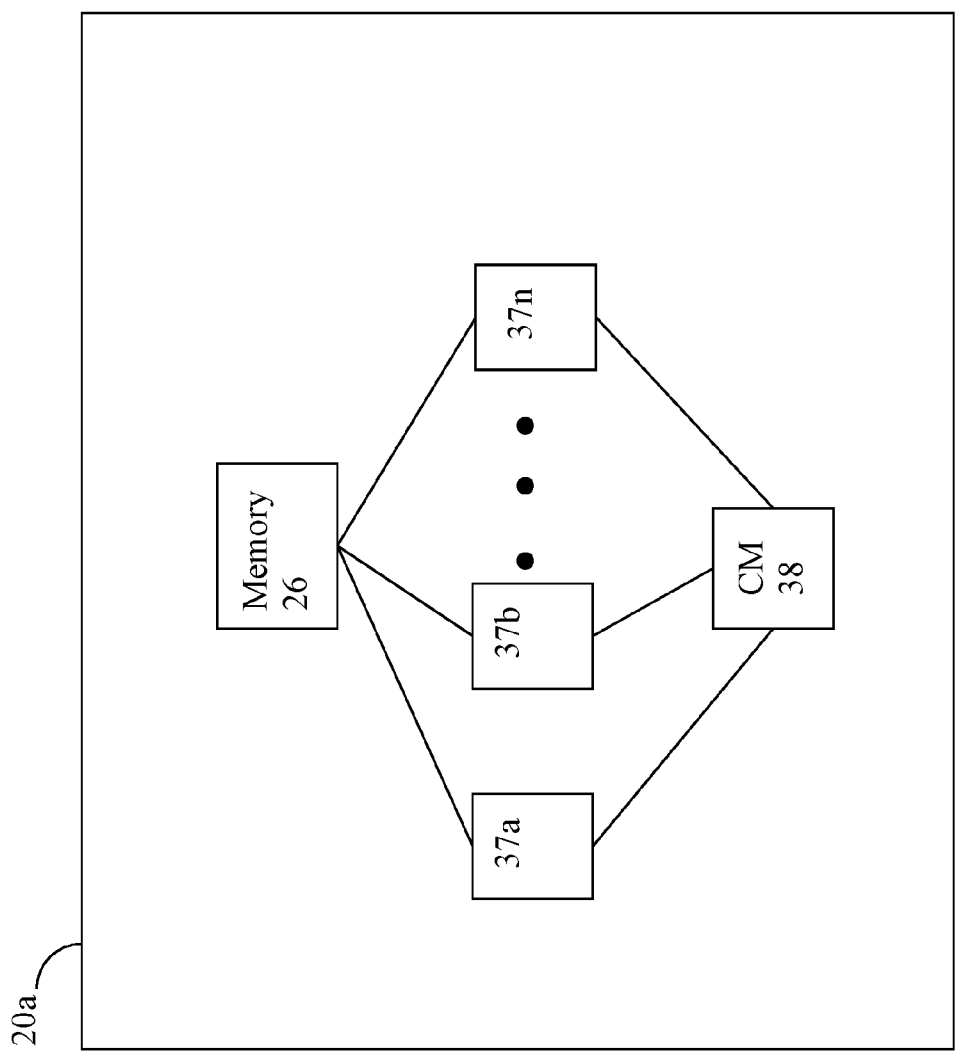
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. An acknowledgement regarding the write completion may be returned to the host or other client issuing the write operation after the write data has been stored in cache. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host. An I/O operation such as a read or write operation received from a host may be directed to a LUN and a location or offset (e.g., such as a logical block address (LBA)) of the LUN.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX® data storage array by EMC Corporation of Hopkinton, Mass. In the foregoing data storage array, the data storage devices 16a-16n may include a combination of rotating disk drives and flash drives. The flash devices may be constructed using nonvolatile semiconductor NAND flash memory. The flash devices may include one or more SLC (single level cell) devices and/or MLC (multi level cell) devices.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. In at least one embodiment of a data storage system in accordance with techniques herein, the data storage system may include multiple CPU "cores" or processors partitioned to function as the different components, such as DAs, FAs, RAs and the like, and to perform tasks handled by such components. For example, a number of CPU processors or cores may be configured to function as DAs and read data from physical storage and write data to physical storage (e.g., performing back end I/O operations and processing tasks denoting a back end I/O workload). As another example, a number of CPU processors or cores may be configured to function as FAs and receive external I/Os such as from hosts or other clients of the data storage system (e.g. where such processors perform processing and handling of front end I/O operations denoting a front end I/O workload). The various CPU processors or cores may have their own memory used for communication between other CPU processors or cores rather than utilize a global memory accessible to all storage processors. In such embodiments, memory 26 may represent memory of the CPU processors or cores.

With reference back to FIG. 1, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix® Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Figure 3:
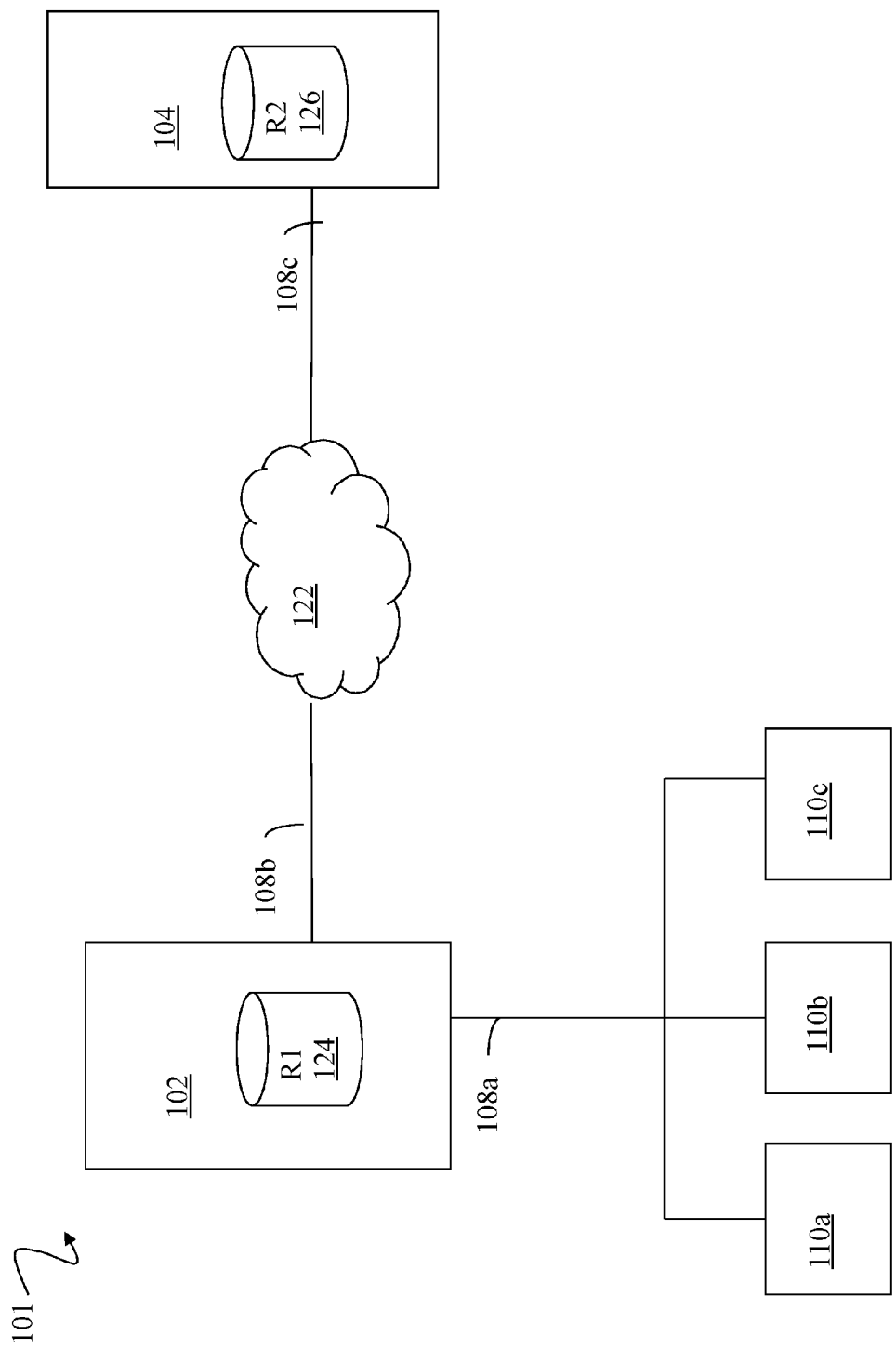
FIGS. 3 and 4 are examples illustrating active-passive remote replication configurations.

Referring to FIG. 3, shown is an example of an embodiment of a system 101 in an active-passive configuration. It should be noted that the embodiment illustrated in FIG. 3 presents a simplified view of some of the components illustrated in FIG. 1, for example, including only some detail of the data storage systems 12 for the sake of illustration.

Included in the system 101 are data storage systems 102 and 104 and hosts 110a, 110b and 210c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

Consistent with description herein, the data storage systems 102 and 104 may include one or more data storage devices. In this example, data storage system 102 includes storage device R1 124 and data storage system 104 includes storage device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 210a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix® data storage systems using SRDF® is described, for example, in U.S. Pat. Nos. 5,742,792, 5,544,347, 7,054,883, and 8,335,899, all of which are incorporated by reference herein in their entirety. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein in its entirety. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

In at least one embodiment in accordance with techniques herein described in more detail below, data replication may be performed in a synchronous manner such as using SRDF® operating in a synchronous mode (SRDF®/S). With synchronous mode data replication, a host 110a may issue a write to the R1 device 124. The primary or R1 data storage system 102 may store the write data in its cache at a cache location and mark the cache location as including write pending (WP) data as mentioned elsewhere herein. The remote data replication facility operating in synchronous mode, such as SRDF®/S, may propagate the write data across an established RDF link (more generally referred to as a the remote replication link or link) such as over 108b, 122, and 108c, to the secondary or R2 data storage system 104 where the write data may be stored in the cache of the system 104 at a cache location that is marked as WP. Once the write data is stored in the cache of the system 104 as described, the R2 data storage system 104 may return an acknowledgement to the R1 data storage system 102 that it has received the write data. Responsive to receiving this acknowledgement from the R2 data storage system 104, the R1 data storage system 102 may return an acknowledgement to the host 110a that the write has been received and completed. Thus, generally, R1 device 124 and R2 device 126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
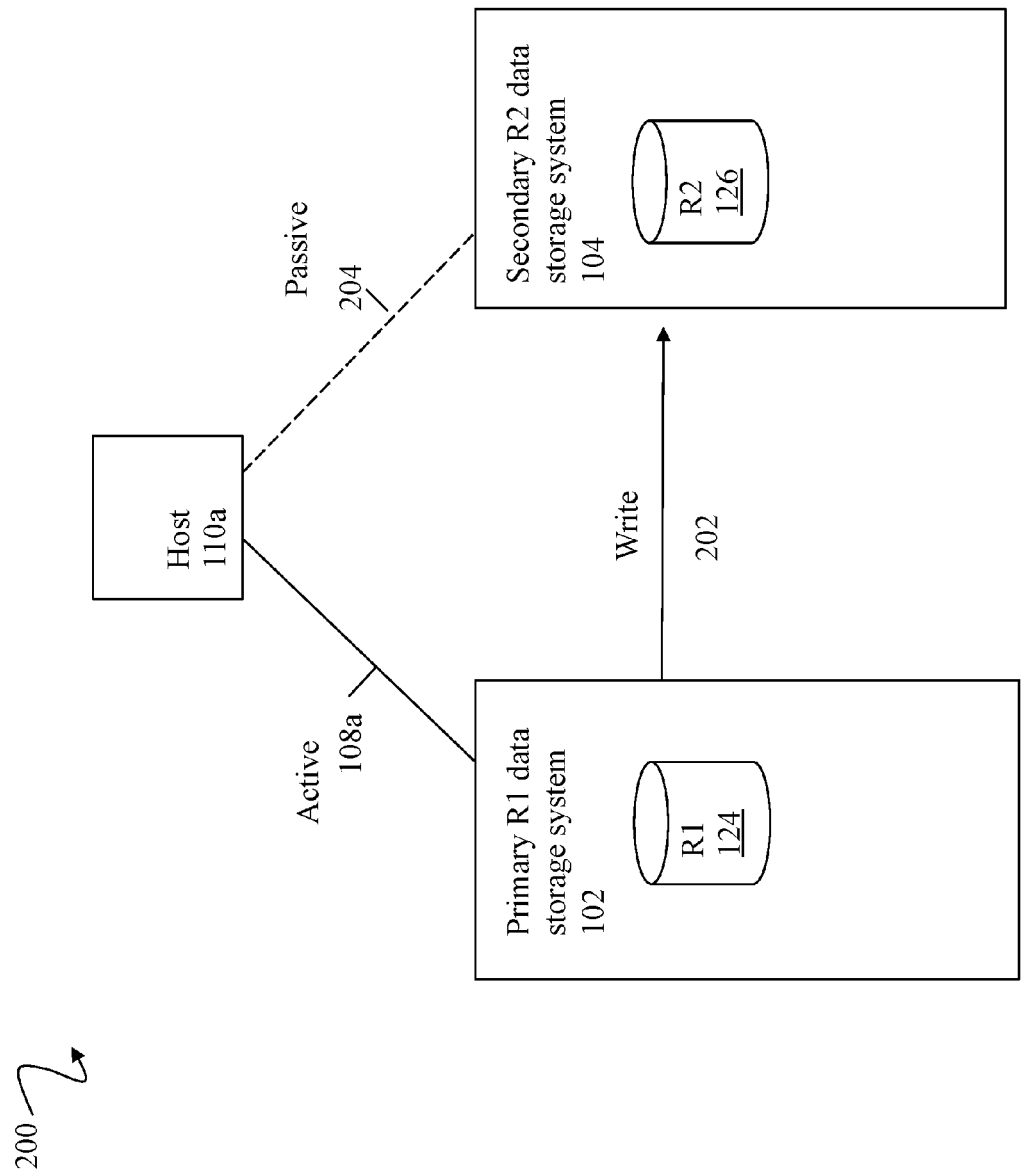

With reference to FIG. 4, shown is a further simplified illustration of components as described in connection with FIG. 3 with a single host 110a. It should be noted that element 202 generally represents the replication link used in connection with sending write data from the primary R1 data storage system 102 to the secondary R2 data storage system 104. It should be noted that link 402, more generally, may also be used in connection with other information and communications exchanged between 102 and 104 for replication. As mentioned above, when operating in synchronous replication mode, host 110a issues a write, or more generally, all I/Os including reads and writes, over a path to only the primary R1 data storage system 102. The host 110a does not issue I/Os directly to the R2 data storage system 104. The configuration of FIG. 4 may also be referred to herein as an active-passive configuration used with synchronous replication where the host 110a has an active connection or path 108a over which all I/Os are issued to only the R1 data storage system. The host 110a may have a passive connection or path 204 to the R2 data storage system 104. In the configuration of 200, the R1 device 124 and R2 device 126 may be configured and identified as the same LUN, such as LUN A, to the host 110a. Thus, the host 110a may view 108a and 204 as two paths to the same LUN A where path 108a is active (over which I/Os may be issued to LUN A) and where path 204 is passive (over which no I/Os to the LUN A may be issued). Should the connection 108a and/or the R1 data storage system 102 experience a failure or disaster whereby access to R1 124 configured as LUN A is unavailable, processing may be performed on the host 110a to modify the state of path 204 to active and commence issuing I/Os to the R2 device configured as LUN A. In this manner, the R2 device 126 configured as LUN A may be used as a backup accessible to the host 110a for servicing I/Os upon failure of the R1 device 124 configured as LUN A. The configuration in FIG. 4 may be referred to as an active-passive RDF configuration and may be contrasted with an active-active RDF configuration as will be described in connection with FIG. 5.

Figure 5:
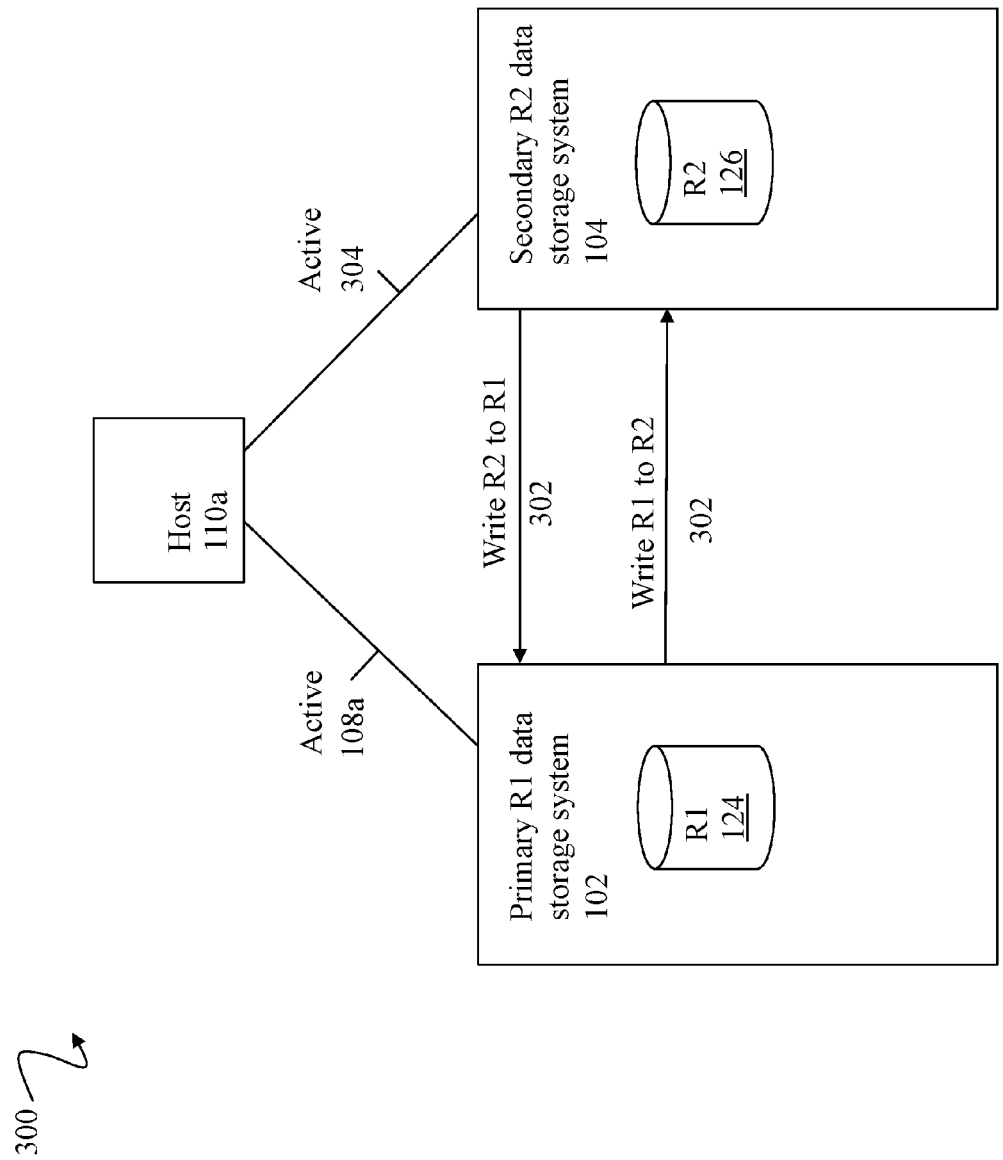
FIGS. 5, 7A, 7B, 7C, 7D, 7E, 7F, 10, 12 and 13 are examples illustrating active-active remote replication configurations in embodiments in accordance with techniques herein.

Referring to FIG. 5, shown is another configuration of components that may be used in an embodiment in accordance with techniques herein. The example 300 illustrates an active-active configuration in connection with synchronous replication as may be used in an embodiment in accordance with techniques herein. In an active-active configuration with synchronous replication, the host 110a may have a first active path 108a to the R1 data storage system and R1 device 124 configured as LUN A. Additionally, the host 110a may have a second active path 304 to the R2 data storage system and R2 device 126 configured as LUN A. From the view of the host 110a, paths 108a and 304 appear as 2 paths to the same LUN A as described in connection with FIG. 3 with the difference that the host in the example 300 configuration may issue I/Os, both reads and/or writes, over both of paths 108a and 304. The host 110a may send a first write over path 108a which is received by the R1 system 102 and written to cache of the R1 system 102 where, at a later point in time, the first write is destaged from the cache of the R1 system 102 to physical storage provisioned for the R1 device 124 configured as LUN A. The R1 system 102 also sends the first write to the R2 system 104 over link 202 where the first write is written to cache of the R2 system 104, where, at a later point in time, the first write is destaged from the cache of the R2 system 104 to physical storage provisioned for the R2 device 126 configured as LUN A. Once the first write is written to the cache of the R2 system 104, the R2 system 104 sends an acknowledgement over link 202 to the R1 system 102 that it has completed the first write. The R1 system 102 then returns an acknowledgement to host 110a over path 2108a that the first write has completed.

The host 110a may also send a second write over path 304 which is received by the R2 system 104 and written to cache of the R2 system 104 where, at a later point in time, the second write is destaged from the cache of the R2 system 104 to physical storage provisioned for the R2 device 126 configured as LUN A. The R2 system 104 also sends the second write to the R1 system 102 over a second link 302 where the second write is written to cache of the R1 system 102, and where, at a later point in time, the second write is destaged from the cache of the R1 system 102 to physical storage provisioned for the R1 device 124 configured as LUN A. Once the second write is written to the cache of the R1 system 102, the R1 system 102 sends an acknowledgement over link 302 to the R2 system 104 that it has completed the second write. The R2 system 104 then returns an acknowledgement to host 110a over path 304 that the second write has completed.

Effectively, the active-active configuration used with synchronous replication as in FIG. 5 has the R2 system 104 acts as another primary data storage system which facilitates propagation of writes received at the data storage system 104 to the data storage system 102. It should be noted that although FIG. 4 illustrates for simplicity a single host accessing both the R1 device 124 and R2 device 126, any number of hosts may access one or both of the R1 device 124 and the R2 device 126.

Data storage systems may perform processing to guarantee some type of atomicity with respect to performing I/O operations such as concurrent reads and/or writes directed to the same data area. For example, with reference to FIG. 5 where the R1 and R2 devices are both configured as the same LUN A, the host 110a may issue a first I/O operation that is a write to LUN A, location X over connection 108a and a second I/O operation that is a read also directed to the same LUN A, location X over connection 108a. Before the write is acknowledged by the data storage system 102, the second I/O operation that is a read directed to the same data area of LUN X, location X is received by the data storage system 102. The foregoing first and second I/O operations may be referred to as concurrent I/O operations.

The result of the second I/O operation that is a read noted above may be expected to be either the old data at LUN A, location X prior to applying the write data of the first I/O operation, or the new write data stored at LUN A, location X after the write is applied. Thus, the data storage system may perform processing with respect to data stored on the system at a level of granularity of a complete I/O operation. For example, the data storage system prevents the read from returning a mixture of both the old data and the new write data whereby the write operation is only partially applied to LUN A, location X when returning data for the read to LUN A, location X. Another example of concurrent I/O operations is when the first I/O operation is a write as described above and the second I/O operation is a second write to write second new data to LUN A, location X, rather than a read. After both concurrent writes are processed, the final result at LUN A, location X is expected to be either first write data of the first write, or second write data of the second write, but not a mixture of both some of the first write data and the second write data stored in the resulting location.

In an embodiment of a data storage system as described herein, a cache may be used to store the write data. The cache may be partitioned into cache segments also referred to as cache pages (or simply pages). The size of a cache page may vary with embodiment. A host or other data storage system client may issue a large write operation which writes data exceeding the size of one cache page. Thus, the write data stored in the cache for a single write operation may span multiple cache pages when stored in cache prior to destaging. A write operation that writes data spanning more than one cache page may be referred to herein as a multiple page write or a multi-page write. In connection with maintaining the write level atomicity for large write, one method may lock all cache pages of the write to prevent concurrent access. Such cache page locks may provide exclusive access of the corresponding locked cache pages to the thread or process which holds one of the locks. However, this may be undesirable, for example, because other non-conflicting writes may be delayed and this may require a large amount of page locks for the cache to be held concurrently for the single write.

It should generally be noted that in at least one embodiment, a cache page lock acquired during processing described herein may provide for exclusive access to the locked cache page unless another type of lock access is otherwise indicated.

As a variation, a lingering lock may be used in connection with maintaining write atomicity across multiple cache pages containing multi-page write data. Consider a single data storage system receiving a multi-page write from a host. In this case, the data storage system may utilize lingering locks with processing multi-page writes to maintain write level atomicity across pages as will now be described. As a first step, a first multi-page write directed to LUN A, location X may be received by the data storage system. Assume for illustration that the write spans three cache pages P1, P2 and P3. For example, the length of the write data and target location may be equal to the length/size of 3 cache pages denoted by the cache pages appended in a sequential order P1, P2, and P3. The sequential ordering of the cache pages P1, P2 and P3 may correspond to the sequential increasing order of the logical address space of LUN A denoted by the target location X. More generally, the ordering may denote any predetermined sequential ordering of the cache pages. In a second step, the storage system locks the first page P1. In a third step, the data storage system stores the first page of write data in cache page P1. In a fourth step, the data storage system locks the second page P2. In a fifth step, the data storage system unlocks or releases the lock on the cache page P1. In a sixth step, the data storage system stores the second page of write data in cache page P2. In a seventh step, the data storage system locks the third page P3. In an eighth step, the data storage system releases the lock on cache page P2. In a ninth step, the data storage system stores the write data in cache page P3. In a tenth step, the data storage system releases the lock on cache page P3. Each of the cache page locks may provide exclusive access of the locked cache page to the lock holder (e.g., process or thread performing processing for the particular write I/O). The foregoing processing may be generally referred to as the first lingering lock processing for an I/O operation. In the foregoing example, the I/O operation is a write. However, as described below in more detail, similar processing may also be performed with respect to an I/O operation that is a read.

Thus, the foregoing processing may be repeated, sequentially in order, for all three cache pages P1, P2 and P3 for the first multi-page write whereby cache pages P1, P2 and P3 are updated to include the first multi-page write data. Now, prior to completing the foregoing of storing the write data in P1-P3 for the first multi-page write, assume another second concurrent I/O operation (e.g., write operation or read operation) also directed to LUN A, location X is received where servicing the second concurrent I/O operation processing attempts to access the same cache pages P1-P3 as now being written by the first multi-page write. Processing for the second concurrent I/O operation may be performed in a manner similar to that as described for the first multi-page write using the first lingering lock processing by accessing the cache pages P1-P3 sequentially in order and locking/obtaining cache page locks, and releasing the cache pages locks as just described for the first multi-page write with the difference that rather than write data to each cache page once the lock is obtained, data is read from the cache page. In this manner, the ordering in which processing sequentially obtains the cache page locks guarantees that the second concurrent read or write (which also requires a cache page lock) will not jump in front of the first multi-page write while it is being processed. In other words, the foregoing processing using the lingering lock approach guarantees that the first multi-page write updates cache pages P1-P3 in sequential order and that the second concurrent operation will also update (for write) or access (for read) cache pages P1-P3 in the same sequential order and cannot proceed passed a cache page that is locked for processing by the first multi-page write.

Figure 6:
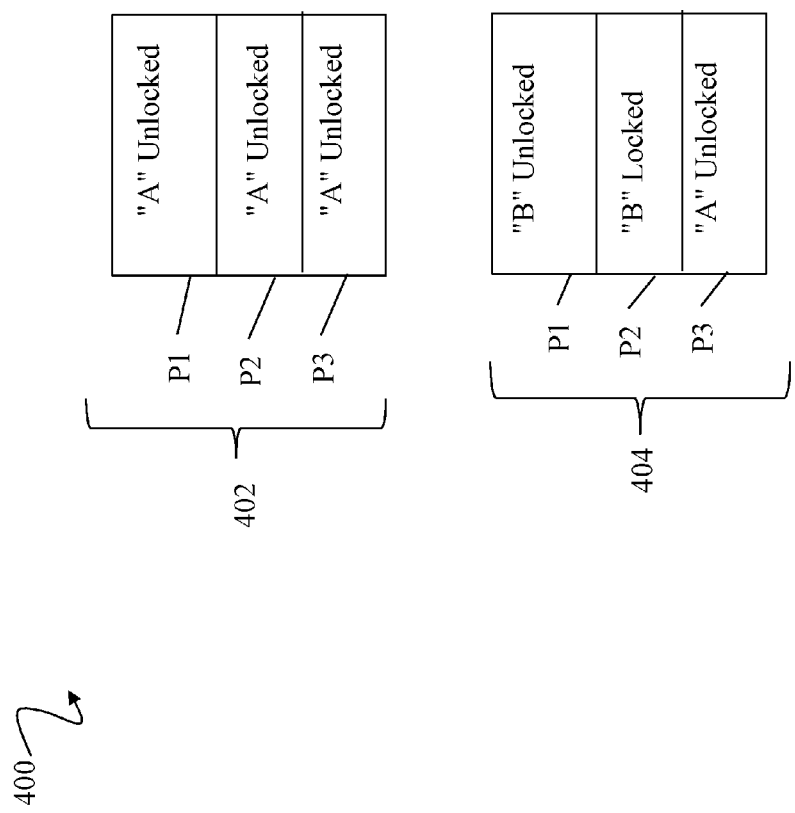
FIGS. 6 and 11 are examples illustrating a multi-page I/O in an embodiment in accordance with techniques herein.

For example, with reference to FIG. 6, assume that element 402 illustrates the contents of the 3 cache pages P1-P3 when the first multi-page write spanning cache pages is received and denotes the contents of such cache pages P1-P3 for LUN A, location X prior to commencing processing for the first multi-page write. As noted in 402, each of cache pages P1-P3 is unlocked. Element 404 may denote a snapshot regarding the processing state of the cache pages P1-P3 when servicing the first multi-page write that writes "B" to each of the 3 cache pages P1-P3. In particular, 404 indicates that processing for the first multi-page is in progress and partially completed where the write data "B" has been stored in cache pages P1 and P2 and cache page P2 is currently locked (e.g., processing for the sixth step noted above is completing and the seventh step of locking P2 has not yet been performed). If a second concurrent read, for example, is received which reads from the same LUN A, location X, processing of the second read to retrieve read data from cache pages P1-P3 will sequentially proceed to read data from cache pages P1-P3. However, processing for the second concurrent read at this point will only be able to read data from P1 and waits to access the data in P2 since it is locked for use in processing the first multi-page write. Processing of the second concurrent read will not proceed to the next page P3 until it has first read the data from P1 and also P2. In this manner, the second concurrent read is paused to wait for the lock on P2 prior to reading the data for P2. Processing for the concurrent read will not jump over or pass the first multi-page write already in progress (e.g., currently accessing P2) and write level atomicity for the first multi-page write is preserved. The second concurrent read will result in "BBB" (e.g., B for each of 3 cache pages) being returned to the requesting host.

Figure 6B:
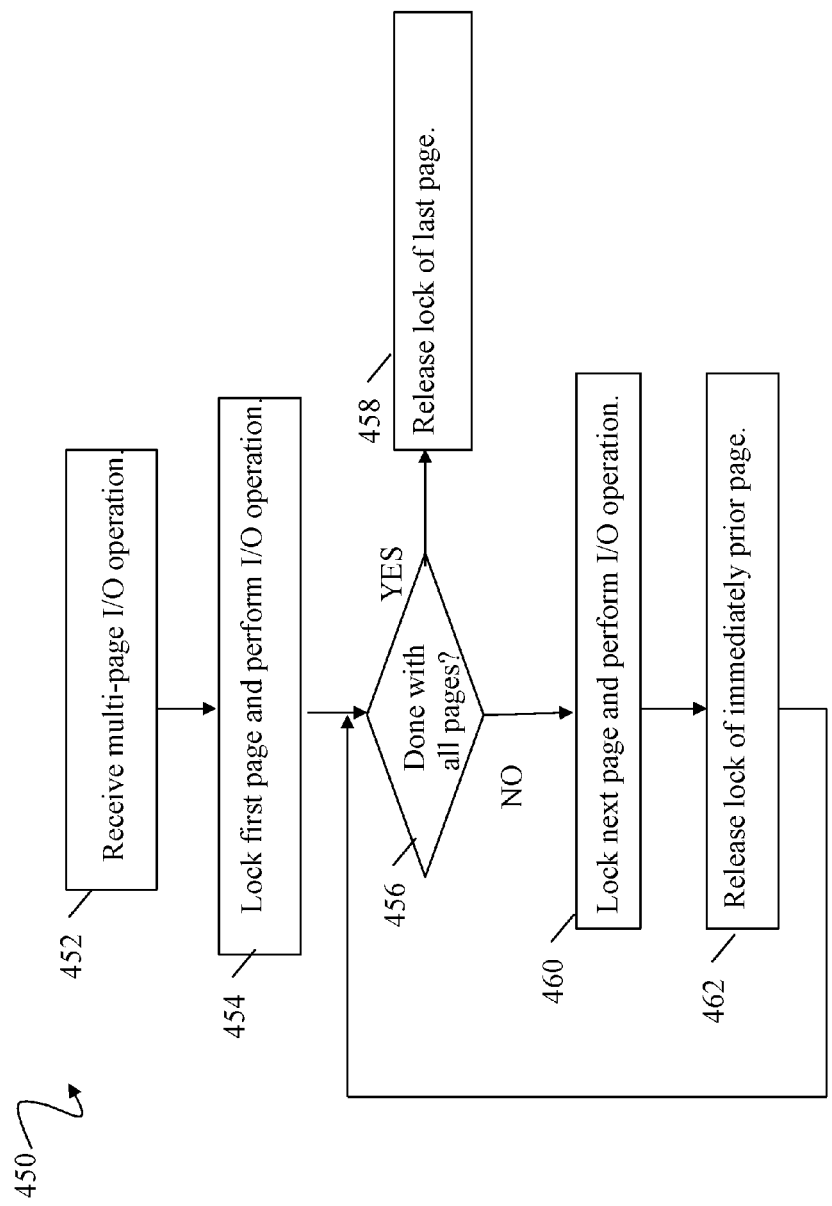
FIGS. 6B, 8, 9 and 14 are examples of flowcharts of processing steps that may be performed in an embodiment in accordance with techniques herein.

Referring to FIG. 6B, shown is a flowchart of processing steps that may be performed in an embodiment in accordance with techniques herein. The flowchart 450 generally summarizes processing as just described for the first lingering lock processing as may be performed with respect to a received I/O operation that is a read or a write where such an I/O operation may span multiple cache pages (e.g., multi-page I/O operation). At step 452, the multi-page I/O operation may be received at a data storage system. At step 454, the first cache page is locked and the I/O operation may be performed with respect to the first cache page. At step 456, a determination is made as to whether all cache pages of the I/O operation have been processed. If step 456 evaluates to no, control proceeds to step 460 to lock the next cache page and perform the I/O operation with respect to this next cache page. Control proceeds to step 462 to release the lock on the immediately prior page and control proceeds step 456. If step 456 evaluates to yes, control proceeds to step 458 where processing is performed to release the lock of the last page.

What will now be described is further application and extension of the lingering lock approach in connection with maintaining the write level atomicity across two data storage systems in an arrangement such as in FIG. 5 where two devices, such as two LUNs, are exported as a single same device, such as the same LUN A, when presented to the host. In such a scenario, it is desirable to maintain write level atomicity with respect to I/O issued to LUN A presented without introducing additional locks.

To further illustrate techniques herein, an embodiment will be described as illustrated in FIG. 5 where two data storage systems are exporting the same device, such as the same LUN, to the host as with active-active RDF where the host may issue I/Os to the LUN over two paths. As described below in more detail, techniques herein extend and apply the lingering lock approach across both data storage systems.

Following is a first example illustrating processing that may be performed in an embodiment in accordance with techniques herein in connection with multiple figures denoting different states and associated processing points. In this first example, assume that a first multi-page write is received that writes data "BBB" to 3 cache pages ("B" to each cache page) overwriting old or original data "AAA". The multi-page write may be directed to write the foregoing write data "BBB" to a target location on LUN A having the old data "AAA" prior to performing the multi-page write as described above. Techniques of the first example described below may be used in connection with a multi-page write and concurrent reads directed to the same target location whereby data at the target location returned for a read is guaranteed to preserve write level atomicity (e.g., a read will result in returning the old data "AAA" or will result in returning the result of applying the complete multi-page write thus preserving write I/O operation level atomicity).

Figure 7A:
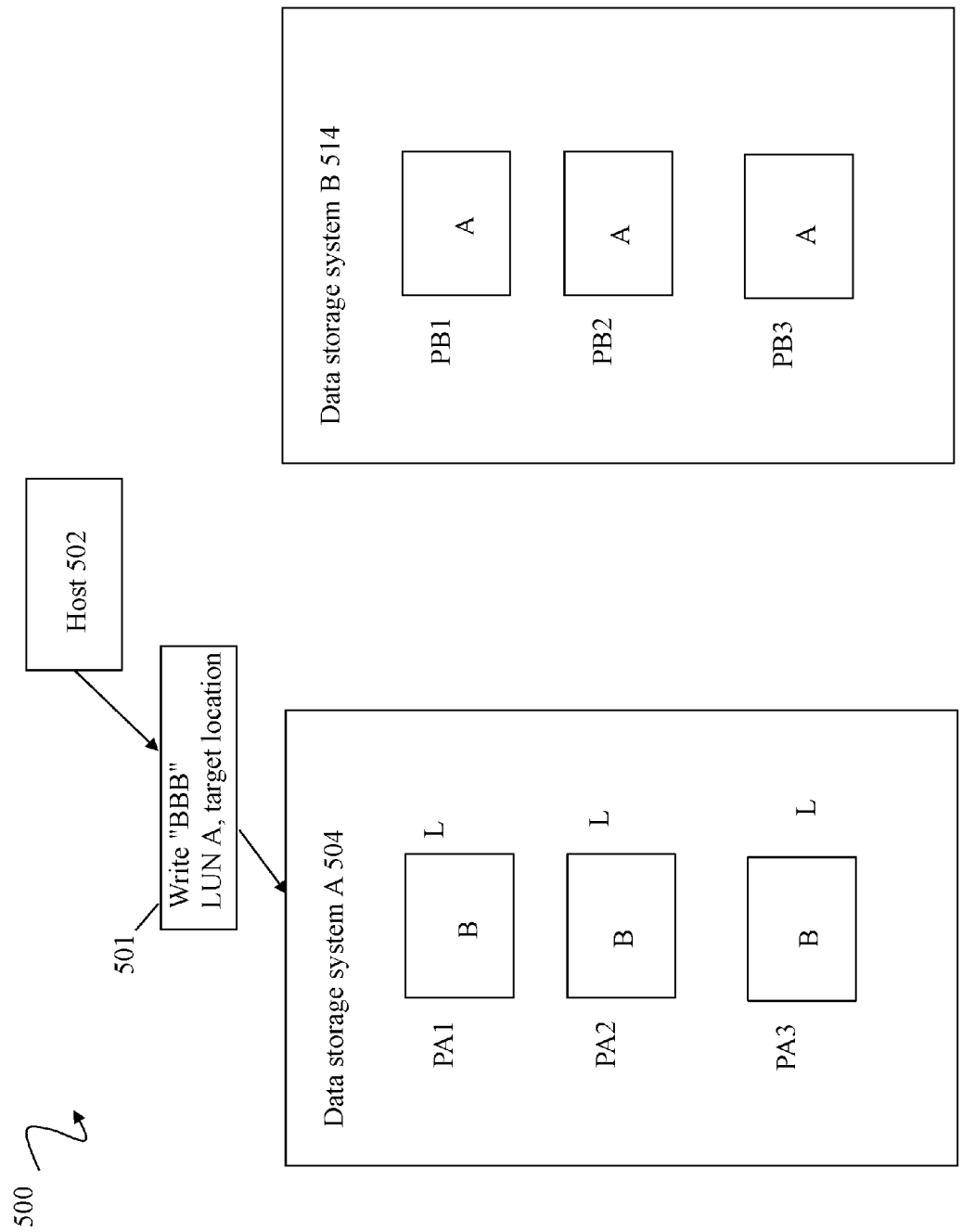

Referring to FIG. 7A, shown is an example illustrating processing that may be performed in an embodiment in accordance with techniques herein. In the example 500, shown is a host 502, data storage system (DS) A 504 and data storage system (DS) B 514. As described above in connection with FIG. 5, the host 502 may issue I/Os directly to both DS A 504 and DS B 514. What will now be described is processing that may be performed in connection with a multi-page write. In this example, the host 502 issues the first multi-page write 501 as noted above to DS A 504. On DS A 504, the write data "BBB" of write 501 may be stored in 3 cache pages PA1, PA2 and PA3. Elements PB1, PB2, and PB3 denote 3 cache pages on DS B 514 which will be used in subsequently described processing to store, respectively, cached write data from cache pages PA1, PA2 and PA3 of DS A 504. Thus, PA1, PA2 and PA3 denotes the order in which pages of the multi-page write are processed on DS A 504 and PB1, PB2 and PB3 denotes the order in which pages of the multi-page write are processed on DS B 514.

DS A 504 processes the cache pages PA1-PA3 in order where such processing, for each of the cache pages PA1-PA3 includes: locking the cache page, writing the write data "B" to the cache page on DS A, sending a replication request to replicate the cache page write data "B" on the remote DS B 514, waiting for an acknowledgement from DS B 514 that the cache page write data has been replicated on DS B 514 (by being stored in a cache page on DS B 514), and then releasing the lock on the cache page on DS A. As just described, the data storage system DS A 504 may process the cache pages PA1-PA3 in order but additionally does not unlock the cache page until it receives an acknowledgment from DS B 514 that the particular cache page data has been synchronously replicated to the remote system DS B 514. In at least one embodiment, locks for the cache pages may be acquired in order. However, once a cache page lock for a first cache page has been acquired, remaining processing for the first cache page may proceed independent of processing of any prior pages (e.g., cache page PA2 may be transmitted to DS B for replication prior to successful complete transmission of PA1 to DS B whereby transmission of PA2 and PA1 may occur concurrently).

For performance reasons, an embodiment in accordance with techniques herein may immediately send each individual cache page's data in a replication request to the remote system DS B 504 once the write data "B" for that individual page has been written to DS A 504's cache. In other words, once a lock on a cache page of the multi-page write has been acquired, processing as described for that cache page of the multi-page write on DS A 504 may be performed independent of the other cache pages. For example, transmitting the replication request to replicate write data of a first cache page PA1 on the remote system DS B may commence prior to storing any write data in the cache page PA3. Thus, commencing transmission of a replication request to replicate data of a cache page from DS A 504 to DS B 514 does not have to wait for all write data of the multi-page write to be stored in the cache pages PA1-PA3. Additionally, as noted above, a lock on a single cache page of the multi-page write on DS A may be released or unlocked once that particular cache page of data has been successfully replicated on the remote system DS B. Thus, for example, cache page PA3 may be synchronously replicated successfully prior to completing synchronous replication of cache page PA1. In this case, processing to synchronously replicate cache pages PA1 and PA 3 of DS A on DS B may be performed concurrently, and additionally PA3 transfer may complete prior to PA1 transfer whereby PA3 may be unlocked while PA1 is still locked.

An embodiment may acquire the locks on PA1, PA2 and PA3 in sequential order and then commence storing the write data in each such cache pages once its lock has been acquired. If a lock cannot be acquired on a particular page, such as PA2, processing on DS A may wait to acquire the lock on PA2 prior to performing further processing in connection with PA2 and also prior to proceeding with acquiring the lock for PA3. As write data for each cache page PA1-PA3 is stored on DS A 504, the write data for that cache page may be sent in a replication request to DS B 514. Due to network conditions, the replication requests to replicate data from the 3 cache pages PA1-PA3 may arrive on DS B 514 in any order.

Illustrated in FIG. 7A is a state of the processing of the multi-page write at a first point in time where locks on 2 cache pages PA1 and PA2 have been acquired and where write data may be in the process of being received and stored in cache pages PA1, P2 and PA3.

It should be noted that a locked cache page as described in connection with this example may denote that the cache page is locked for exclusive access for processing the multi-page write. In this figure and others herein, an "L" next to a particular cache page denotes the cache page is locked and otherwise the cache page is unlocked.

What will now be described is processing that may be performed on DS B 514 where, as noted above, the replicated cache pages of write data for PA1-PA3 may arrive in any order. In connection with transmitting replication requests to replicate cached data of the multi-page write as described herein, each such request may identify the particular cache page position or ordering with respect to the multi-page write. For example, the request may identify that the cache page being transmitted from DS A for replication on DS B is cache page N of M where M identifies the total number of cache pages in the multi-page write and N identifies the position or ordering of the current cache page being transmitted with respect to the entire multi-page write (e.g., 1 of 3 (for first cache page in this example), 2 of 3, or 3 of 3 (for the last cache page in this example)).

When DS B 514 is processing the replication requests to replicate the cache page data from PA1-PA3, cache pages PB1-PB3 are locked in sequential order. For the first cache page of the write (PA1 to be stored in PB1), DS B 514 obtains the lock for PB1, stores the cached page PA1 in PB1, and waits for all the data of PA1 to be received and stored in PB1. For remaining cache pages (PA2 and PA3 replicated and stored in, respectively, PB2 and PB3) of the write other than the first cache page, DS B waits for the previous cache page to be locked before acquiring the lock on this particular page. For example, DS B waits for PB1 to be locked prior to acquiring the lock on PB2.

When all data for the last cache page PB3 of the multi-page write has been received on DS B and stored in the cache of PB3, an acknowledgement (ACK) may be returned to DS A indicating that the last cache page PA3 has been replicated on DS B and the lock on PB3 may be released. When all data is received on DS B for any other cache page of the multi-page write which is not the last cache page of the multi-page write (e.g., data received for PB1 or PB2), DS B similarly returns an ACK but waits for the replication request for the next cache page to begin processing (e.g., waits for next cache page to be locked) prior to releasing the lock on the cache page. For example, cache page PA1 may be stored in cache page PB1 and an ACK may be returned to DS A. Prior to releasing the lock on PB1, processing waits for the lock to be acquired for PB2 in connection with processing the replication request that stores PA2 in cache page PB2.

On DS A 504, when an ACK is receiving indicating successful replication of a cache page of DS A, the particular cache page of DS A that has been replicated on DS B may be unlocked. Once DS A receives ACKs that all cache pages PA1-PA3 of the multi-page write have been successfully replicated on remote system DS B, an I/O acknowledgement regarding successful completion of the write 501 may be returned to the host 502.

Figure 7B:
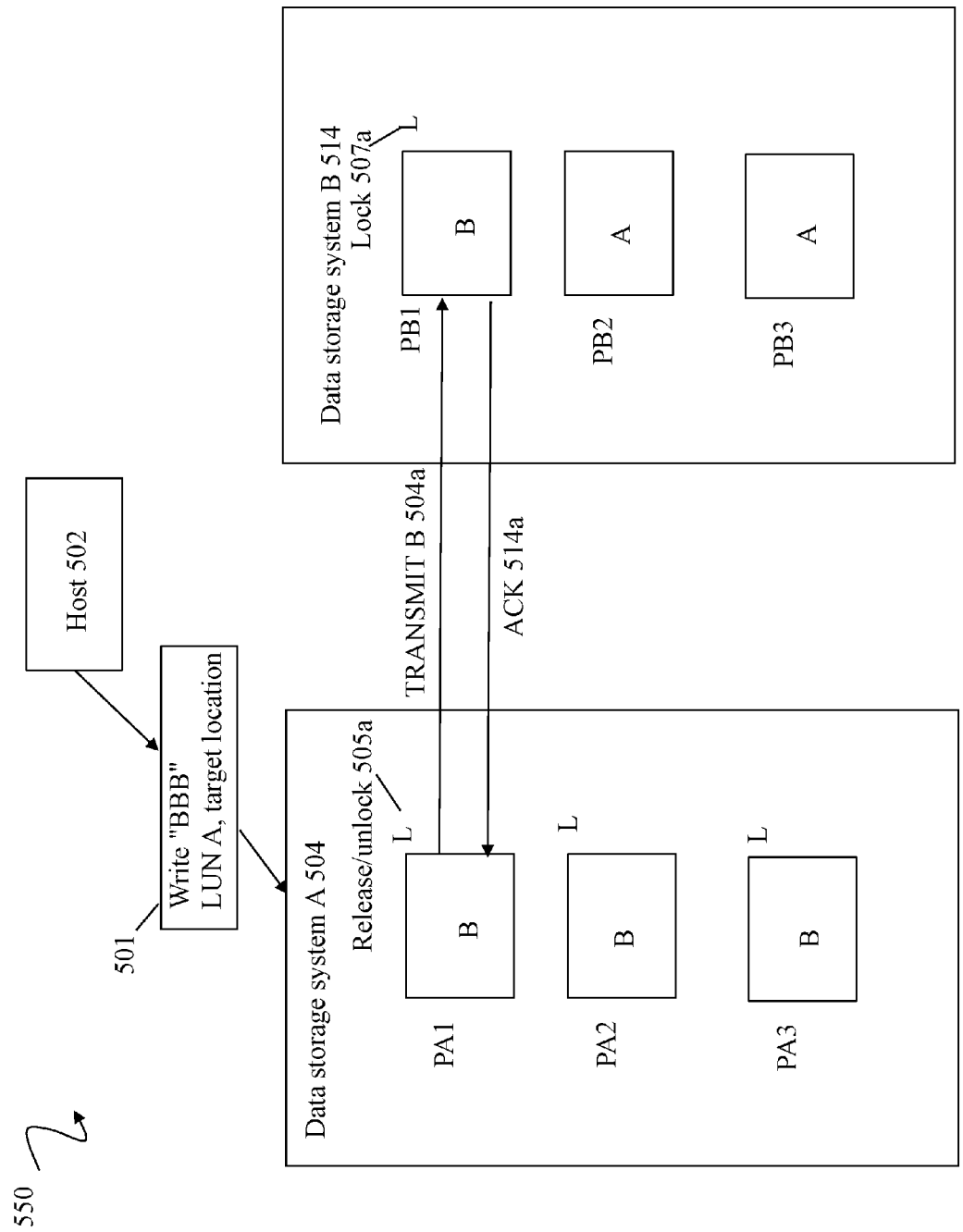

To further illustrate, reference is made to FIG. 7B which shows processing in this first example at a second point in time subsequent to the first point in time of FIG. 7A. At this second point in time, assume that the portions of the write data of the write request 501 for PA2 and PA3 are still in the process of being written to such cache pages PA2 and PA3 and that write data for PA1 has been completely written to PA1. Subsequently, in the example 550, a replication request is transmitted 504a from DS A to DS B to replicate the write data of cache page PA1 on DS B. Since this is the first cache page of the multi-page write, the lock 507a is obtained for the first cache page PB1 on DS B. In this example, assume all data of PA1 has arrived at DS B and the write data "B" for the first cache page is then stored in PB1, an ACK 514a is sent to DS A indicating successful replication of the write data from PA1 to DS A, and then the lock on cache page PA1 on DS A is released 505a. However, the lock on PB1 is not yet released.

Figure 7C:
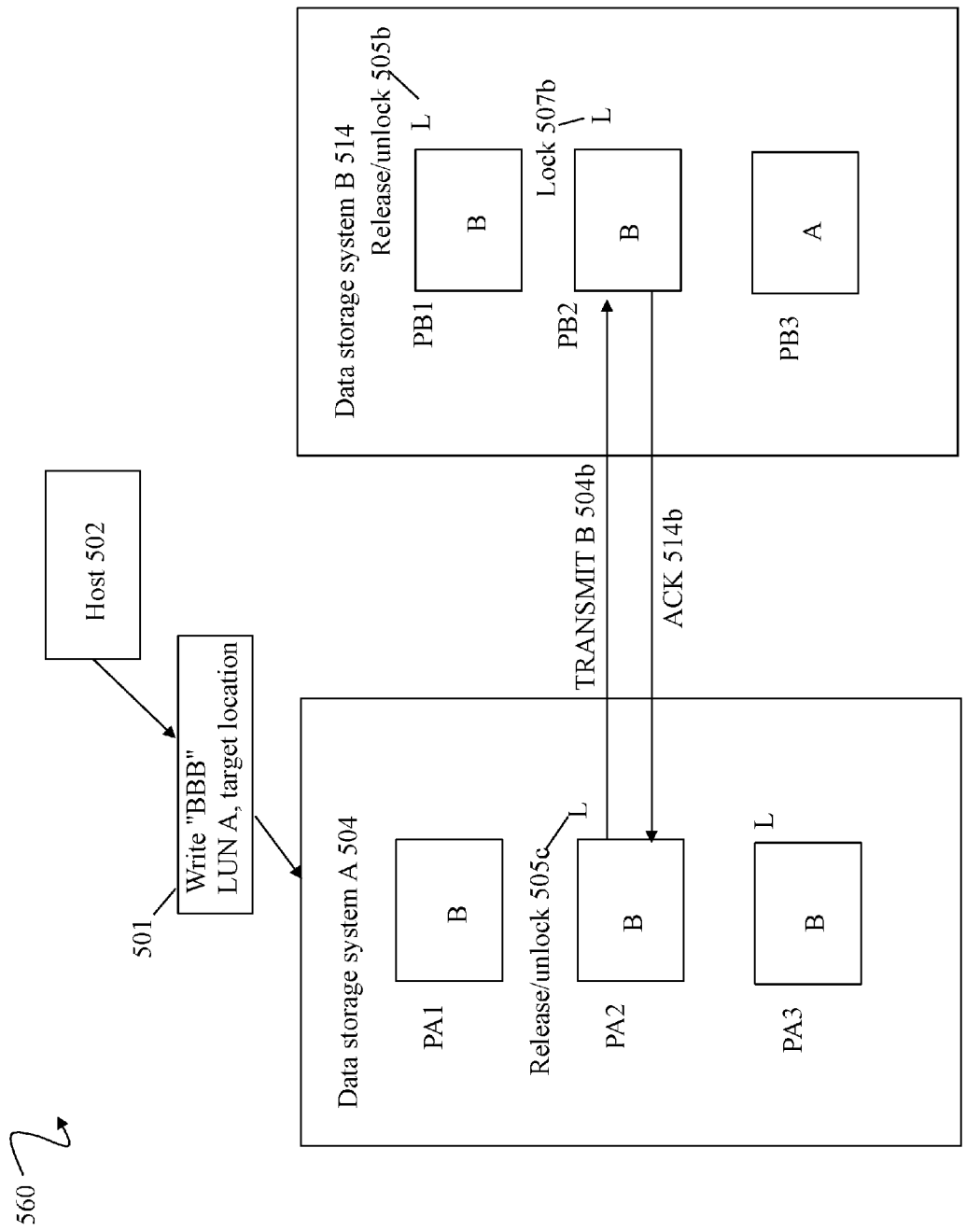

With reference to FIG. 7C, illustrated is processing in this first example at a third point in time subsequent to the second point in time of FIG. 7B. At this third point in time, all data for cache page PA2 has been stored in PA2 but not yet for PA 3. As such, a replication request is transmitted 504b to DS B to replicate write data of cache page PA2 on DS B. Since PA2 is not the first cache page of the multi-page write, processing is performed to acquire 507b the lock for PB2 and test whether the immediately prior cache page PB1 is locked. If the prior cache page PB1 is not locked, processing for PB2 releases the lock on PB2 and waits for PB1 to be locked before further processing PB2. If the prior cache page PB1 is locked, as in this example, processing for PB2 can proceed since all data for PA1 has arrived at DS 2. At this point, the lock for PB 1 may be released 505b, the write data from PA2 may be stored in PB2, and an ACK 514b is sent to DS A indicating successful replication of the replication request transmitted in 504b (e.g., cache page PA2 has been successfully replicated on DS B). Upon receiving ACK 514b, DS A 504 releases or unlocks 505c cache page PA2.

Figure 7D:
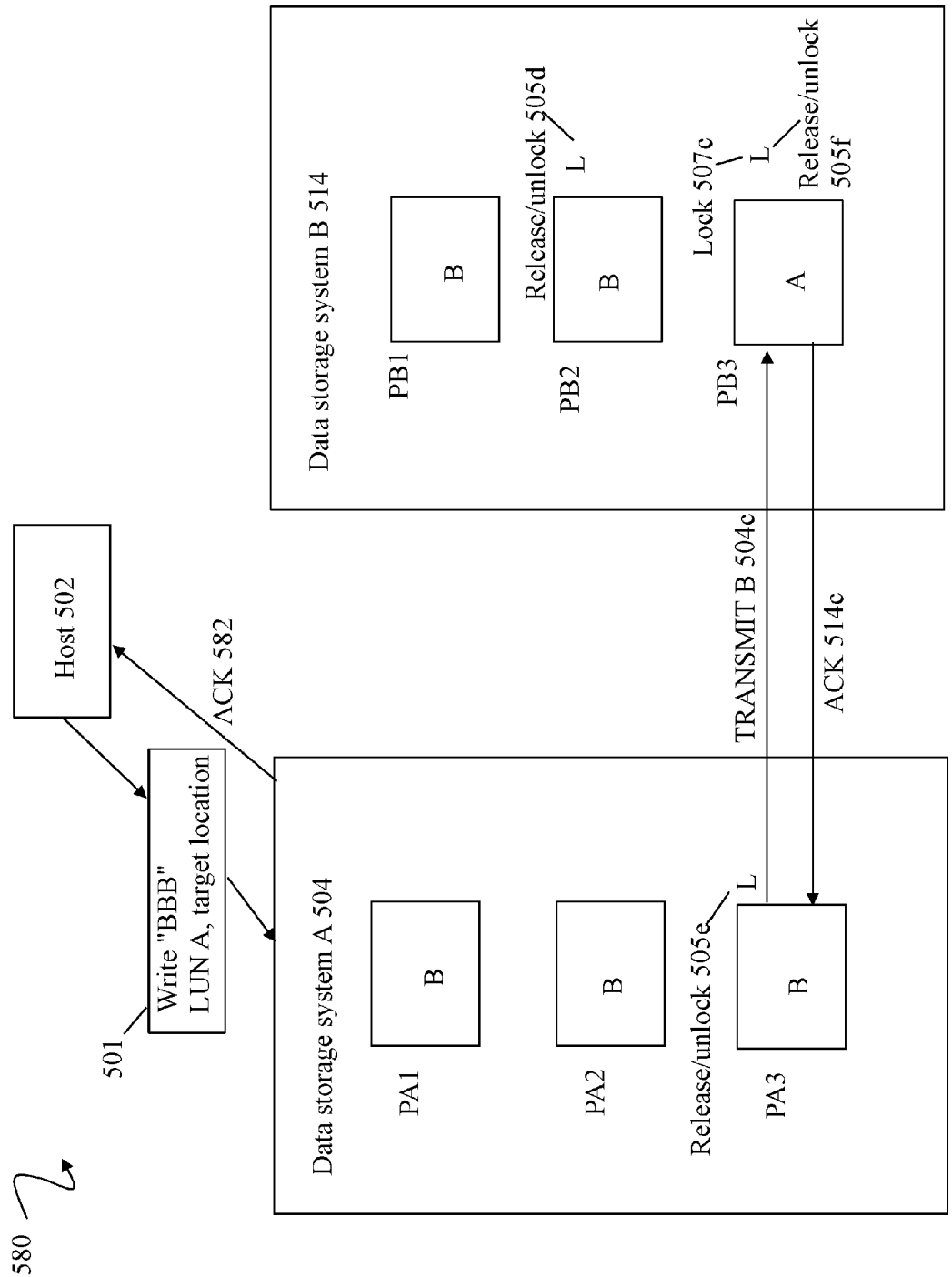

With reference to FIG. 7D, illustrated is processing in this first example at a fourth point in time subsequent to the third point in time of FIG. 7C. At this fourth point in time, all data for cache page PA3 has been stored in PA3. As such, a replication request is transmitted 504c to DS B to replicate write data of cache page PA3 on DS B. Since PA3 is not the first cache page of the multi-page write, processing is performed to acquire 507c the lock for PB3 and test whether the immediately prior cache page PB3 is locked. If the prior cache page PB3 is not locked, processing for PB3 releases the lock on PB3 and waits for PB2 to be locked before further processing PB3. If the prior cache page PB2 is locked, as in this example, processing for PB3 can proceed since all data for PA2 has arrived at DS 2. At this point, the lock for PB 2 may be released 505*d*, the write data from PA3 may be stored in PB3, and an ACK 514*c* is sent to DS A indicating successful replication of the replication request transmitted in 504*c* (e.g., cache page PA3 has been successfully replicated on DS B). Additionally, the lock on PB3 may be released 505*f*. Upon receiving ACK 514*c*, DS B 504 releases or unlocks 505*e* cache page PA3.

At this point in the first example, all cache pages PA1, PA2 and PA3 have been successfully replicated on DS B and an ACK 582 may be sent to the host 502 indicating successful completion of the write 501.

It should be noted that the foregoing example illustrates data of the 3 cache pages PA1, PA2 and PA3 arriving in order on the remote system DS B and accordingly being processed in order by DS B. However, as noted above, the data for caches pages PA1, PA2 and PA3 may arrive in any order. In such cases where, for example, cache page PA3 data arrives completely at DS B prior to PA1 and PA2, processing as just described for PB3 is not allowed to proceed until PB2 is locked which temporarily causes processing of PB3 to wait until processing for PB2 has commenced whereby PB2 will be locked. Additionally, processing for PB2 is not allowed to proceed until PB1 is locked which may result in temporarily pausing processing of PB2 until processing of PB1 has commenced whereby PB1 will be locked.

Figure 7E:
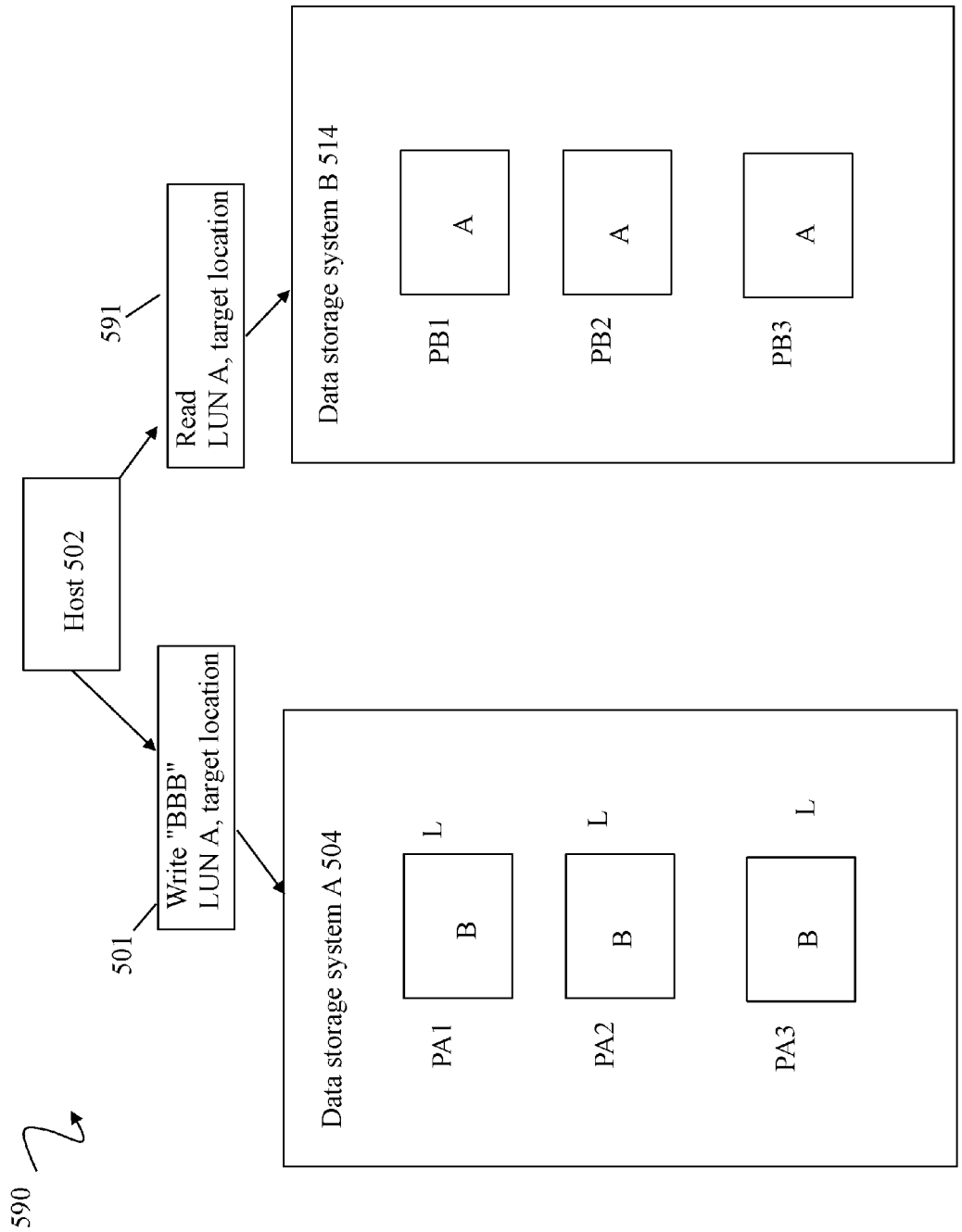

With reference to FIG. 7E, shown is an example illustrating use of techniques herein in connection with processing a multi-page write and also a second concurrent read. The example 590 illustrates use of techniques herein to preserve write level atomicity when the concurrent I/O operation is a read that reads data from the same data area to which the multi-page write is writing to. In FIG. 7E, the host 502, and data storage system 504 and 514 may be configured as described in connection with FIG. 5 in the active-active RDF configuration where the host 502 may issue I/Os directly to both DS A 504 and DS B 514. In this example, the R1 copy of LUN A may be on DS A and the R2 copy of LUN A may be on DS B whereby both of the foregoing copies of LUN A are exposed to the host 502 as the same logical device LUN A. The R1 copy of LUN A may be exposed to the host 502 over a first path or connection from DS A to the host 502 over which write 501 is received and the R2 copy of LUN A may be exposed to the host 502 over a second path or connection from DS B to the host 502 over which read 591 is received. Consistent with description elsewhere herein, writes to the R1 copy of LUN A on DS A are automatically replicated to the R2 copy of LUN A on DS B.

Assume the first multi-page write 501 is received from the host 502 as described above where the write 501 writes data to LUN A, target location X and is received at DS A 504. Additionally assume that a second concurrent I/O 591 that is a read is received from host 502 at DS B 591. The read 591 is a request to read the same data area of LUN A, target location X which is currently being written to by the multi-page write 501. The second concurrent read 591 is received while processing the multi-page write 501 and the system is in the state as described above at the first point in time as illustrated in FIG. 7A where none of the cache pages PB1-PB3 are locked and all have the original data "AAA".

The read 591 may be processed as described herein using the first lingering lock processing for an I/O operation such as illustrated in FIG. 6B. In this case, the processing of the read 591 reads "AAA" which is returned to the host 502. Thus, the write level atomicity is preserved in that the read request results in returning the old data "AAA" prior to performing the write 501.

Figure 7F:
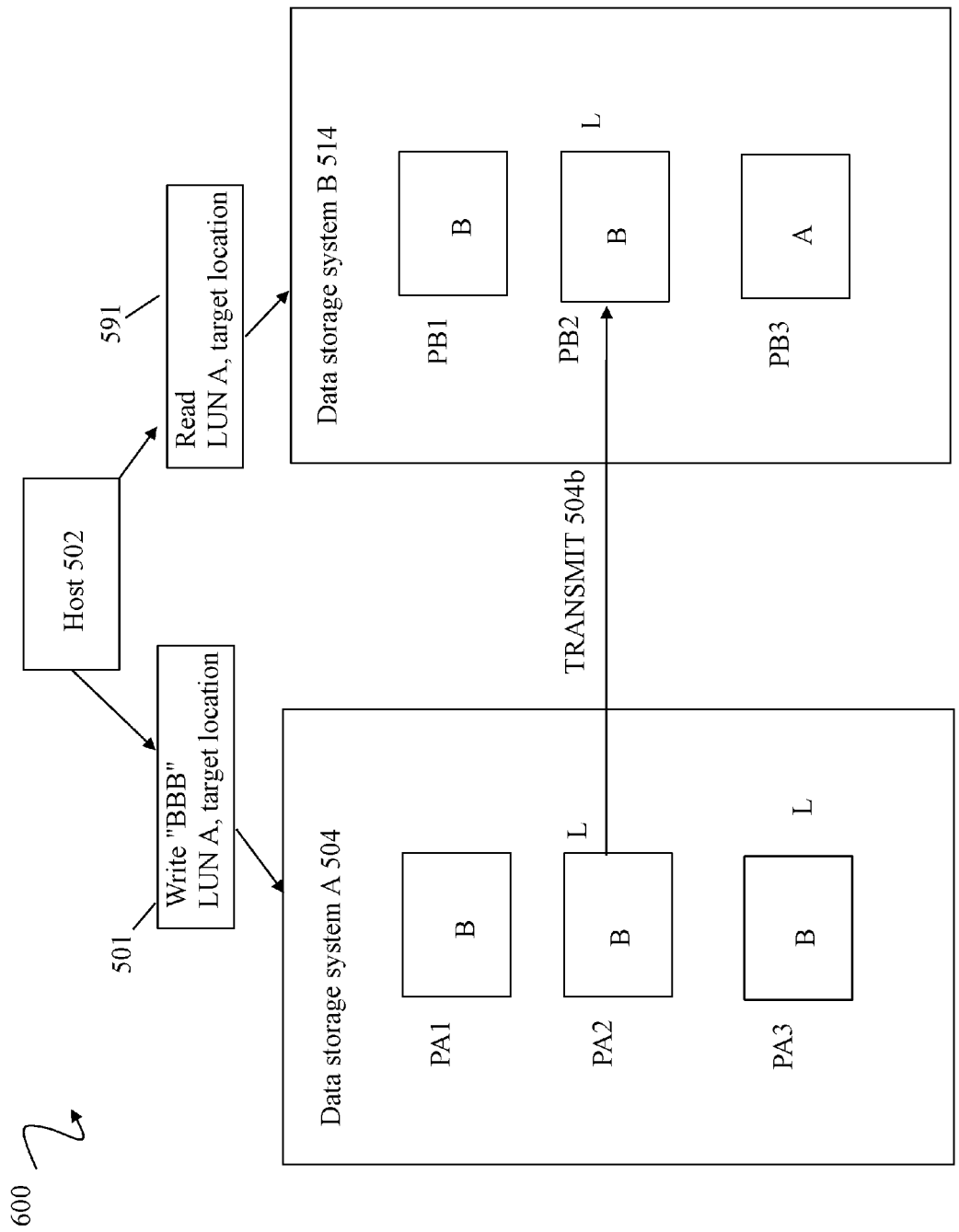

As another example with reference to FIG. 7F, assume the first multi-page write 501 is received from the host 502 as just described where the write 501 writes data to LUN A, target location X and is received at DS A 504. Additionally assume that a second concurrent I/O 591 that is a read is received from host 502 at DS B 591. The read 591 is a request to read the same data area of LUN A, target location X which is currently being written to by the multi-page write 501. The second concurrent read 591 is received while processing the multi-page write 501 and when the system is in a state during processing as described above in connection with the third point in time as illustrated in FIG. 7C. More specifically, in FIG. 7F, when page PB2 is locked and data from cache page PA2 is currently being transmitted 504*b* to PB2.

The read 591 may be processed as described herein using the first lingering lock processing for an I/O operation, such as illustrated in FIG. 6B. In this case with the system in the state as illustrated in 600, the processing of the read 591 reads "B" from cache page PB1 and cannot proceed further to read data from any of PB2 and PB3. At a later point in time, processing to synchronously replicate PA2 in PB2 and PA3 in PB3 completes and the cache pages PB1-PB3 include data "BBB" as illustrated in FIG. 7D. After such processing completes, the remaining requested read data "BB" may be read from cache pages PB2 and PB3 and the requested read data "BBB" may be returned to the host 502. Thus, the write level atomicity is preserved in that the read request results in returning the new write data "BBB" after performing the write 501.

Figure 8:
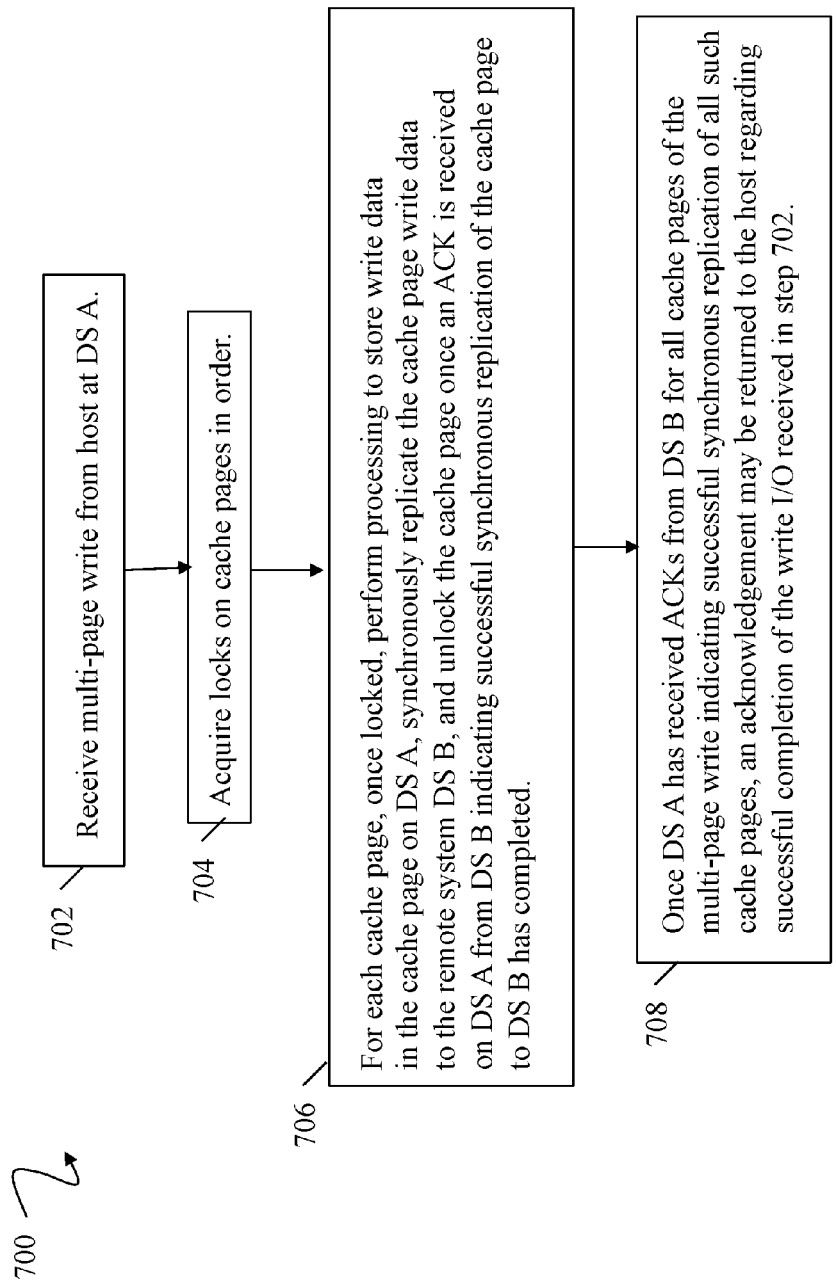
Figure 9:
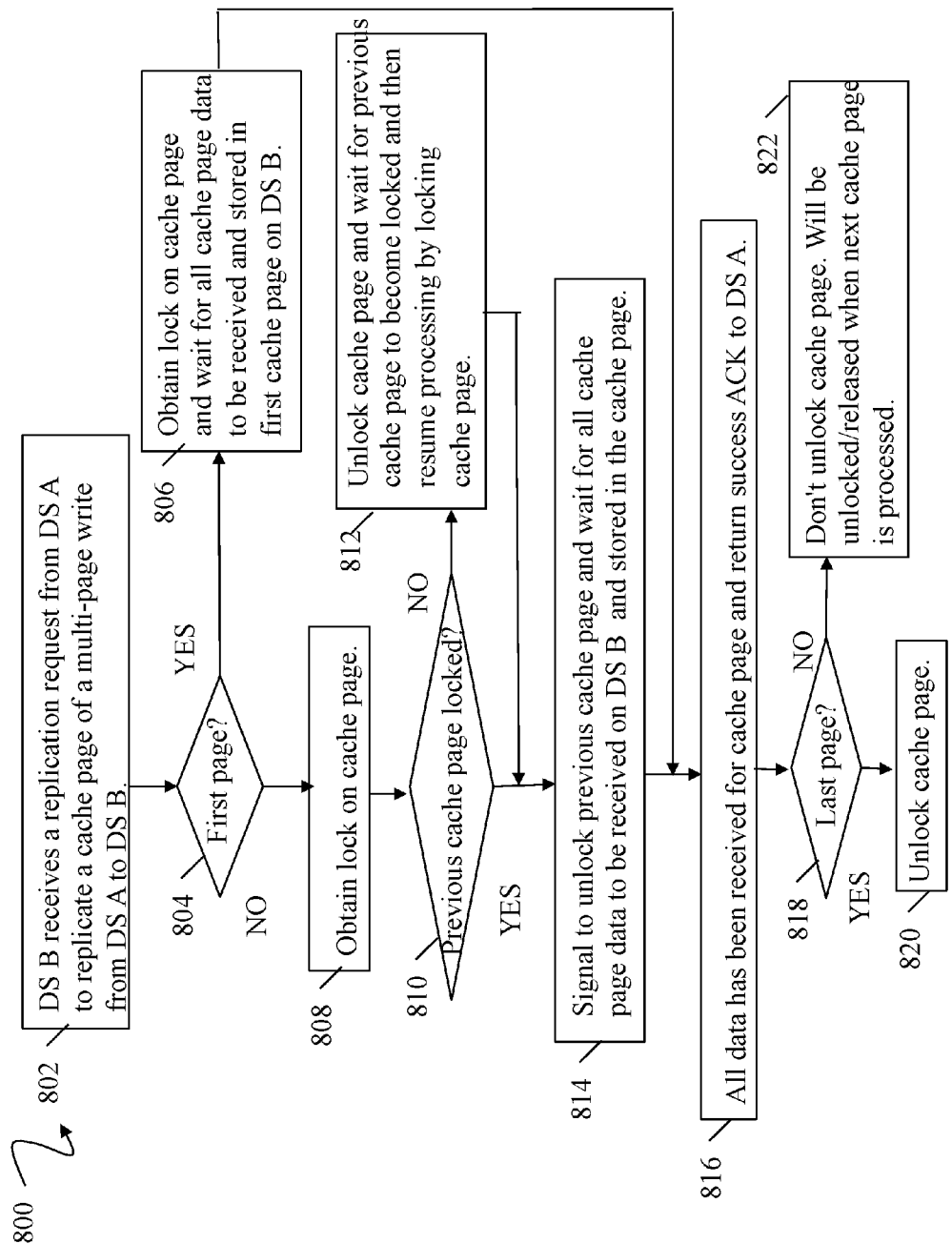

Referring to FIGS. 8 and 9, shown are flowcharts of processing steps that may be performed in an embodiment in accordance with techniques herein to preserve write level atomicity with a multi-page write contending with a concurrent read to the same data area. The flowchart 700 summarizes processing as may be performed in connection with processing the multi-page write on the data storage system, such as DS A, which receives the multi-page write and the flowchart 800 summarizes processing as may be performed in connection with processing for synchronously replicating data of the multi-page write on the remote data storage system, such as DS B.

Referring to FIG. 8, shown is a flowchart of processing steps as may be performed in connection with processing the multi-page write on DS A which receives the multi-page write from a host in step 702. In step 704, locks on the cache pages of the multi-page write are acquired in order. At step 706, for each cache page, once locked, processing may be performed to store write data in the cache page on DS A, synchronously replicate the cache page write data to the remote system DS B, and unlock the cache page once an ACK is received on DS A from DS B indicating successful synchronous replication of the cache page to DS B has completed. At step 708, once DS A has received ACKs from DS B for all cache pages of the multi-page write indicating successful synchronous replication of all such cache pages, an acknowledgement may be returned to the host regarding successful completion of the write I/O received in step 702.

Referring to FIG. 9, shown is a flowchart of processing steps as may be performed in connection with processing for synchronously replicating data of the multi-page write on the remote data storage system, such as DS B. The flowchart 800 outlines processing that may be performed in connection with processing a single replication request received on DS B from DS A in step 802 to replicate a cache page of a multi-page write from DS A to DS B. At step 804, a determination is made as to whether the cache page being replicated is the first cache page of the multi-page write. If step 804 evaluates to yes, control proceeds to step 806 where a lock for the first replicated cache page on DS B is obtained and processing waits for all cache data of the first cache page to be received and stored on DS B. From step 806, processing continues with step 816.

If step 804 evaluates to no, control proceeds to step 808 to obtain the lock on the cache page on DS B to which the replicated cache data received at DS B from DS A is to be stored. At step 810, a determination is made as to whether the previously replicated cache page on DS B is locked. It should be noted that previously replicated cache page in step 810 refers to the cache page have a sequence number or ordering in the multi-page write prior to the current cache page. For example, in a 3 page write such as P1, P2 and P3 described in connection with FIG. 7A, P1 denotes the first page in the multi-page write ordering, P2 denotes the second page in the multi-page write ordering and P3 denotes the third (e.g., last and final) page in the multi-page write ordering so that a request to replicate P3 received in step 802 means that processing of step 810 is performed with respect to page P2 as replicated on DS B.

If step 810 evaluates to no, control proceeds to step 812 where the cache page (locked in step 808) is now unlocked and processing waits for the previously replicated cache page on DS B to become locked. Once the previously replicated cache page on DS B becomes locked, processing is resumed on DS B by again locking the cache page (previously locked in step 808) and processing then proceeds to step 814. If step 810 evaluates to yes, control proceeds to step 814.

At step 814, processing is performed to unlock the previously replicated cache page and wait for all cache page data for the current page to be received on DS B. At step 816, once all data for the cache page currently being replicated has been received on DS B, a successful ACK is returned from DS B to DS A. The ACK denotes to DS A that the cache page of the replication request received in step 802 has been successfully synchronously replicated on DS B. At step 818, a determination is made as to whether the cache page just replicated is the last or final page of the multi-page write. If so, control proceeds to step 820 where the replicated last or final cache page of the multi-page write as stored on DS B is unlocked. If step 818 evaluates to no, control proceeds to step 822 where the cache page locked in step 808 is not yet unlocked. Rather, as described herein, the cache page will be unlocked or released when the next cache page of the multi-page write is processed (e.g., replication request for the next cache page is received and processing is performed to unlock the prior cache page in the multi-page write).

The foregoing lock handling and processing as described in connection with FIGS. 7A-7F, 8 and 9 handles the problem of preserving write level atomicity with a multi-page write contending with a concurrent read to the same data area. However, additional steps are needed in order to also handle the case of two concurrent writes and also guarantee write level atomicity.

Described below is an example illustrating use of techniques herein to preserve write level atomicity with two concurrent multi-page writes to the same data area. Generally, as described below, processing of each of the two concurrent multi-page writes may be performed as described above in connection with a multi-page write contending with a concurrent read with the additional use of techniques that detect a deadlock condition and, once detected, perform further processing to resolve the deadlock. Techniques are described below that may be used in connection with deadlock detection and processing to resolve a detected deadlock in an embodiment in which two concurrent multi-page writes to the same data area on the local and remote data storage system may occur in an active-active RDF configuration (e.g., as in FIG. 5).

Figure 10:
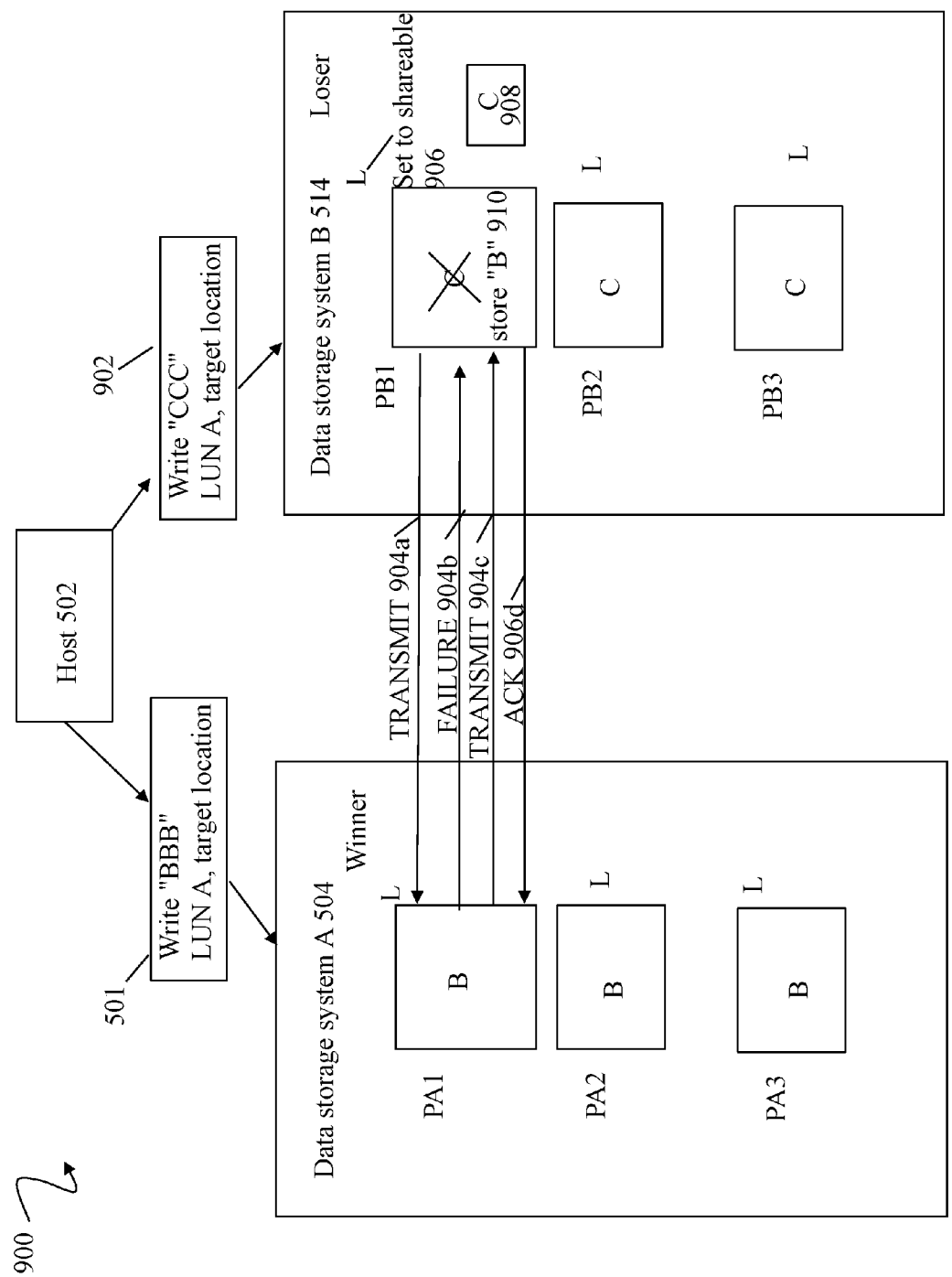

Referring to FIG. 10, shown is another example that may be performed in an embodiment in accordance with techniques herein. The example 900 will be described in more detail below to illustrate use of techniques herein to preserve write level atomicity with the two concurrent multi-page writes 501 and 902 to the same data area in an active-active RDF configuration.

In FIG. 10, the host 502, and data storage system 504 and 514 may be configured as described in connection with FIG. 5 in the active-active RDF configuration where the host 502 may issue I/Os directly to both DS A 504 and DS B 514. In this example 900, the R1 copy of LUN A may be on DS A and the R2 copy of LUN A may be on DS B whereby both of the foregoing copies of LUN A are exposed to the host 502 as the same logical device LUN A. The R1 copy of LUN A may be exposed to the host 502 over a first path or connection from DS A to the host 502 over which write 501 is received and the R2 copy of LUN A may be exposed to the host 502 over a second path or connection from DS B to the host 502 over which write 902 is received. Consistent with description elsewhere herein, writes to the R1 copy of LUN A on DS A are automatically replicated to the R2 copy of LUN A on DS B, and vice versa.

The first write 501 may be as described above which is a multi-page write which writes "BBB" to the target location on LUN A and spans 3 cache pages. The second write 902 may also be a multi-page write which writes "CCC" to the same target location on LUN A as write 501 and also spans 3 cache pages. Assume that DS A 504 receives multi-page write 501 and prior to acknowledging write 501 to the host as complete, DS B 514 receives write 902 directed to the same target location on LUN A as just described. In such a scenario, both DS A and DS B will face contention with the page locks in connection with processing the two concurrent multi-page writes using processing as described herein (e.g., FIGS. 7A-7F and FIGS. 8 and 9). In the example of FIG. 10, processing of the two multi-page writes proceeds where all cache pages PA1-PA3 are locked by DS A 504 for processing its write 501 and cache pages PB1-PB3 are locked by DS B 514 in connection with processing its write 902.

During such processing, DS A and DS B reach a deadlock state which may be detected on a first of the data storage systems when the first data storage system receives a replication request from the second data storage system to replicate a cache page which is already locked on the first data storage system (locked in connection with processing for another multi-page write). For example, a replication request is received on DS B from DS A to replicate first write data (stored at a first location on LUN A) from the first cache page PA1, and the cache page PB 1 on DS B also containing data for the first location on LUN A is already locked such as in connection with a replication request from DS B to DS A. Thus, both cache pages PA1 on DS A and PB2 on DS B contain write data for the first cache page of a multi-page write writing data to the same logical address/data area and both cache pages PA1 and PB2 are locked. Additionally, both DS A and DS B have issued replication requests to one another to replicate the first cache page of a multi-page write (two replication requests to replicate write data from two writes to be stored at the same logical address location). Although the foregoing illustrates performing such detection with respect to the first page of the multi-page writes, it should be noted that the detection may be more generally performed with respect to any cache page of the two concurrent writes. In such a case, a deadlock may be detected and processing may be performed described below in more detail to resolve the deadlock.

To resolve the above-mentioned write contention or deadlock once detected, resolution processing may be performed wherein one of the data storage systems 504 and 514 "backs off" performing its replication request and allows the other data storage system to process its conflicting replication request first. The data storage system allowing the other data storage to process its replication request first is referred to as the loser and the other data storage system which processes its replication request first is referred to as the winner. Thus, the winner DS processes its replication request first and the loser DS processes its replication request second. Generally, any technique may be used to select the winner DS and loser DS so long as both DS 504 and 514 are in agreement. For example, in at least one embodiment in accordance with techniques herein, the R1 data storage system (DS A 504 in this example) may be the winner and the R2 data storage system (DS B 514 in this example) may be the loser.

Techniques for deadlock detection, sending a failure message indicating a retry, and other aspects described elsewhere herein are also generally described, for example, in U.S. patent application Ser. No. 14/982,218, filed Dec. 29, 2015, entitled MULTI-SITE BLOCK LEVEL WRITE CONSISTENCY, Vokaliga, et al, which is incorporated by reference herein in its entirety. The foregoing patent application generally describes having the loser release its lock on the cache page. However, as applied in connection with techniques herein to resolve the contention or deadlock, the loser alternatively may set its page lock to shareable to only allow requests for replication or writing from the other remote write of the winner to proceed. This and other aspects of processing as may be performed in an embodiment in accordance with techniques herein to resolve the contention or deadlock are described in more detail below.

Figure 11:
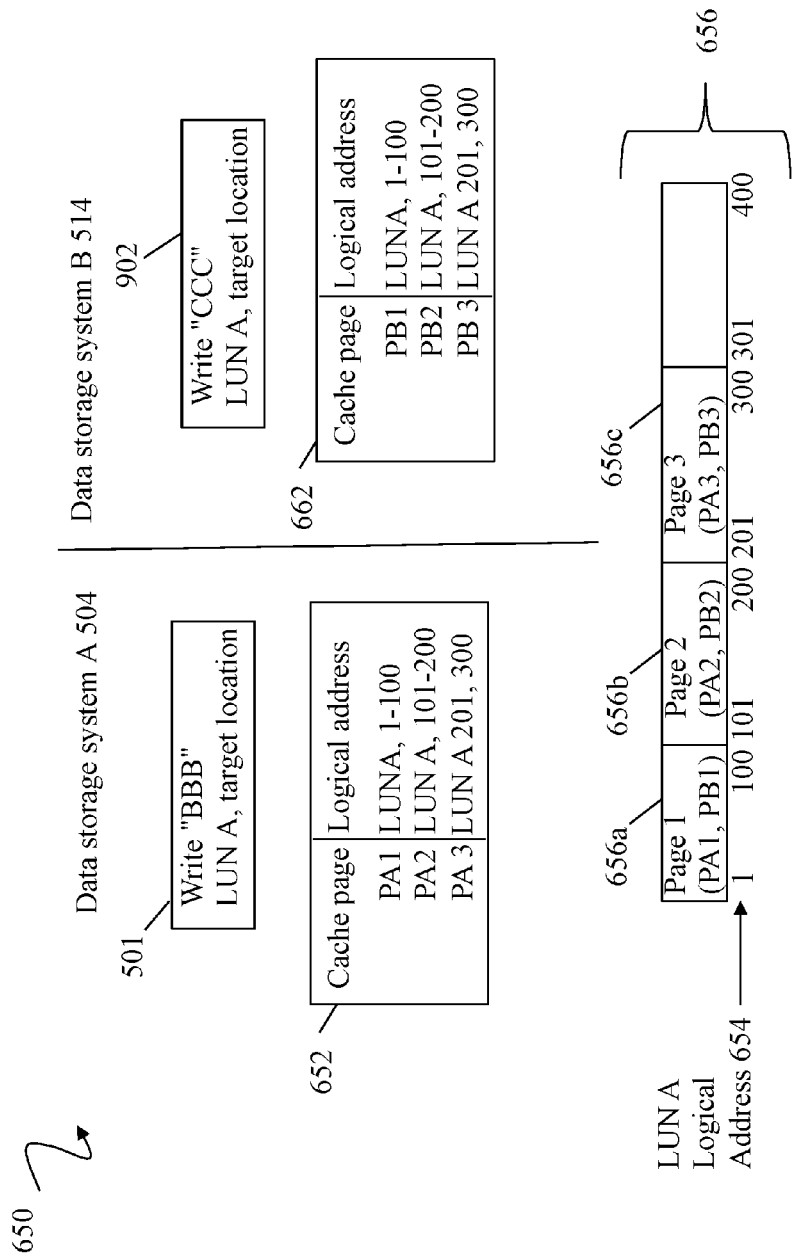

Referring to FIG. 11, shown is an example illustrating in further detail the mapping of cache pages to logical addresses in connection with the write 501 and concurrent write 902 in an embodiment in accordance with techniques herein. The example 650 includes the write 501 as received on DS A 504 and the second write 902 as received on DS B 514. Let, for example, the target location of LUN A, to which each of the I/O operations 501 and 591 is directed, denote LBA 1-300 of LUN A where a cache page is 100 blocks. Thus, consistent with description elsewhere herein, each of the I/Os 501 and and 902 writes to LUN A, LBA 1-300 and spans 3 cache pages. Write 501 writes "BBB" to LUN A, LBA 1-300 and write 902 writes "CCC" to LUN A, LBA 1-300.

On a data storage system generally a cache page contains data mapped to a corresponding LUN location or logical address. On DS A 504, element 652 illustrates a mapping of the three cache pages PA1, PA2 and PA3 on DS A to their respective logical addresses. In particular, cache page PA1 includes cached data for LUN A, LBA 1-100, cache page PA2 includes cached data for LUN A, LBA 101-200 and cache page PA3 includes cached data for LUN A, LBA 201-300.

On DS B 514, element 662 illustrates a mapping of the three cache pages PB1, PB2 and PB3 of DS B to their respective logical addresses. In particular, cache page PB1 includes cached data for LUN A, LBA 1-100, cache page PB2 includes cached data for LUN A, LBA 101-200 and cache page PB3 includes cached data for LUN A, LBA 201-300.

Element 654 may denote the logical address space of LUN A in this example which is 400 logical blocks where the first 300 LBAs of LUN A are the target of the write 501 and also the read 591. As denoted by 656, cache pages PA1 of DS A and PB1 of DS B map to the same logical addresses indicating that both PA1 and PB1 contain cached data for the same data area 656a. Cache pages PA2 of DS A and PB2 of DS B map to the same logical addresses indicating that both PA2 and PB2 contain cached data for the same data area 656b. Cache pages PA3 of DS A and PB3 of DS B map to the same logical addresses indicating that both PA3 and PB3 contain cached data for the same data area 656c.

Thus, when a replication request is issued from DS A 504 to DS B in connection with techniques herein to replicate write data from the first cache page PA1 of the write 501 on DS A to cache page PB1 of DS B, both cache pages PA1 and PB1 map to the same data area or the same logical address locations 656a. In a similar manner, when a replication request is issued from DS B 514 to DS A in connection with techniques herein to replicate write data from the first cache page PB1 of the write 902 on DS B to cache page PA1 of DS A, both cache pages PA1 and PB1 map to the same data area or the same logical address locations 656a.

It should be noted that, consistent with description elsewhere herein, the foregoing mapping of cache pages to logical address space is also more generally applicable to any two I/Os which map to the same data area or same logical addresses.

In connection with deadlock detection techniques as described herein that may be used with two concurrent multi-page writes to the same data area as in FIG. 10, a deadlock may be detected when a first of the data storage systems, such as DS A 504, receives a replication request from the other DS B 514 to replicate a cache page of DS B which maps to the same data area or logical address locations as a corresponding cache page of DS A and where the corresponding page of DS A is currently locked (e.g., such as in connection with performing processing of another I/O operation where a conflicting replication request is issued to replicate the corresponding cache page from DS A to DS B). As noted above, for example, deadlock may be detected on DS A when the first cache page PA1 containing write data for write 501 is locked and DS A receives from DS B a replication request to replicate cache page PB1 to cache page PA1 (where PB1 is mapped to, and contains cached data for, the same data area and logical address as PA1).

With reference back to FIG. 10, assume in this example that DS A 504 is the winner, DS B 514 is the loser. Also as illustrated in the example 900, assume that DS B 514 is currently performing multi-page write processing for write 902 as described herein and currently has cache pages PB1, PB2 and PB3 locked and transmit 904a the replication request to DS A to replicate cache page PB1 in corresponding cache page PA1 on DS A. DS A currently has cache page PA1 locked in connection with performing multi-page write processing for write 501 as described herein.

In a first case as in this example 900, the deadlock may be detected by the winner DS A since PA1 is locked and DS A receives a replication request 904a from loser DS B to replicate PB1 in the locked corresponding cache page PA1 (where PA1 and PB1 are both mapped to the same data area and logical address LUN A, LBA 1-100). In response, DS A sends 904b to DS B a failure notification regarding the replication request 904a. The failure notification may also include a status indicator denoting the failure of the replication request is due to the detection of the deadlock condition (requested page PA1 being locked) by the winner DS A for replication. The status indicator indicates to DS B to perform subsequent processing that later on retries its replication request.

In response to receiving the failure with the above-noted status indicator, DS B first copies its data "C" from the conflicting cache page PB1 to a side buffer 908 providing a temporary storage or memory location. DS B then sets 906 the lock for PB1 to shareable to allow the conflicting remote write for the replication request from DS A to proceed. It should be noted that the page lock on PB1 is not just released to allow any other concurrent writes or reads to access PB1 but rather the lock for PB1 is set to the foregoing shareable status that may selectively only allow the conflicting remote write for the replication request from DS A—to replicate PA1 in cache page PB1—to proceed.

The competing replication request 904c to replicate cache page PA1 in cache page PB1 is now allowed to proceed as described in connection with the multi-page write processing elsewhere herein. In particular, for example, the lock for cache page PA1 is acquired all data "B" from PA1 is transmitted to DS B and stored 910 in PB1, and an ACK 904d is returned to DS A indicating successful synchronous replication of PA1 to PB1 has completed (e.g., the "B" from PA1 has been copied to PB1 as denoted by 910).

Figure 12:
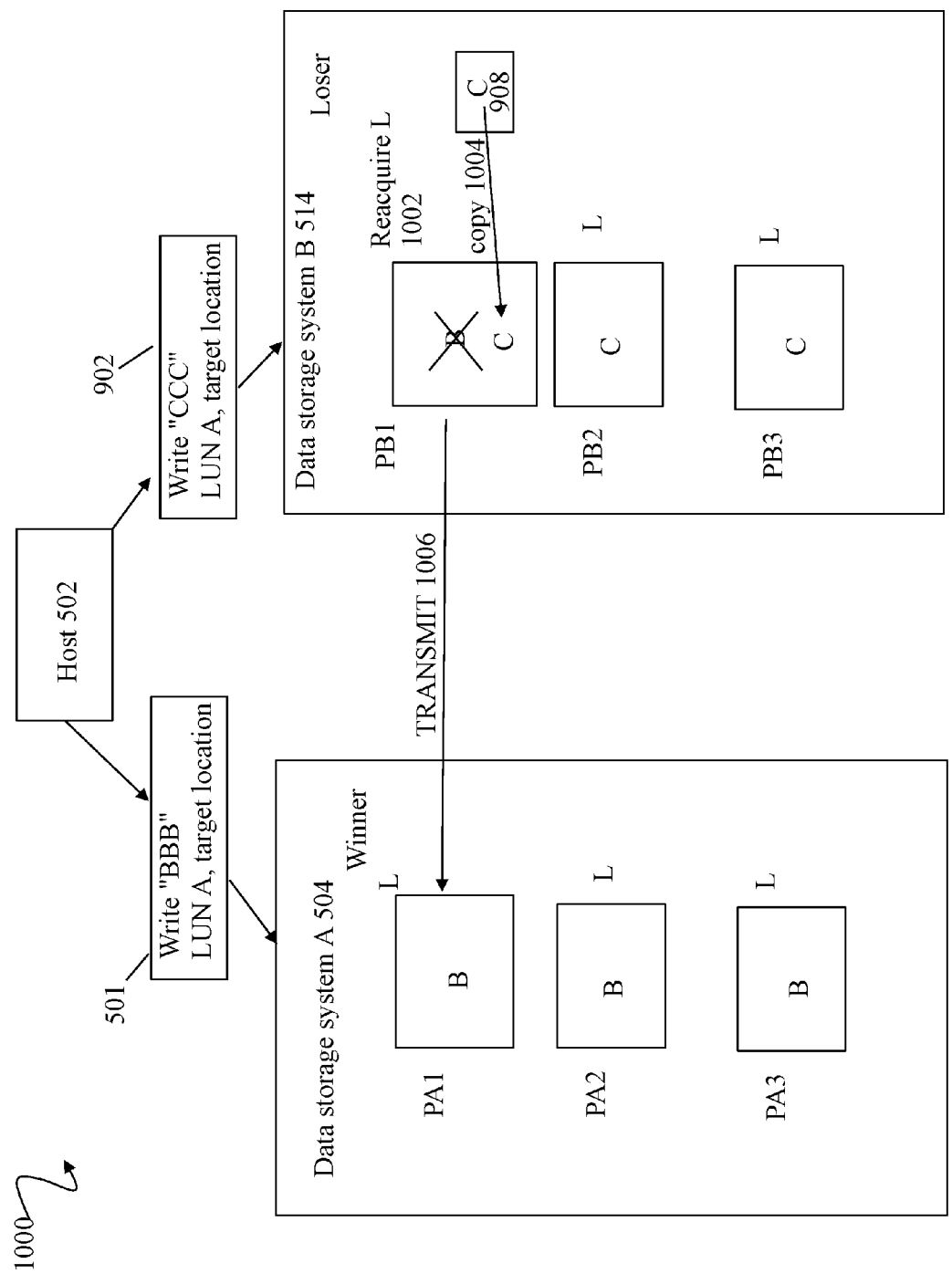

With reference now to FIG. 12, at some later point in connection with multi-page write processing, cache page PB1 is unlocked (e.g., step 822 of FIG. 9) and DS B 514 resumes processing of its write 902 and reacquires 1002 the lock on PB1, copies 1004 data "C" from buffer 908 to the cache page PB1, and then retransmits 1006 the replication request to DS A to replicate cache page PB 1 in cache page PA1 (e.g., copy "C" from PB1 to PA1) in connection with continuing multi-page write processing as described herein.

Figure 13:
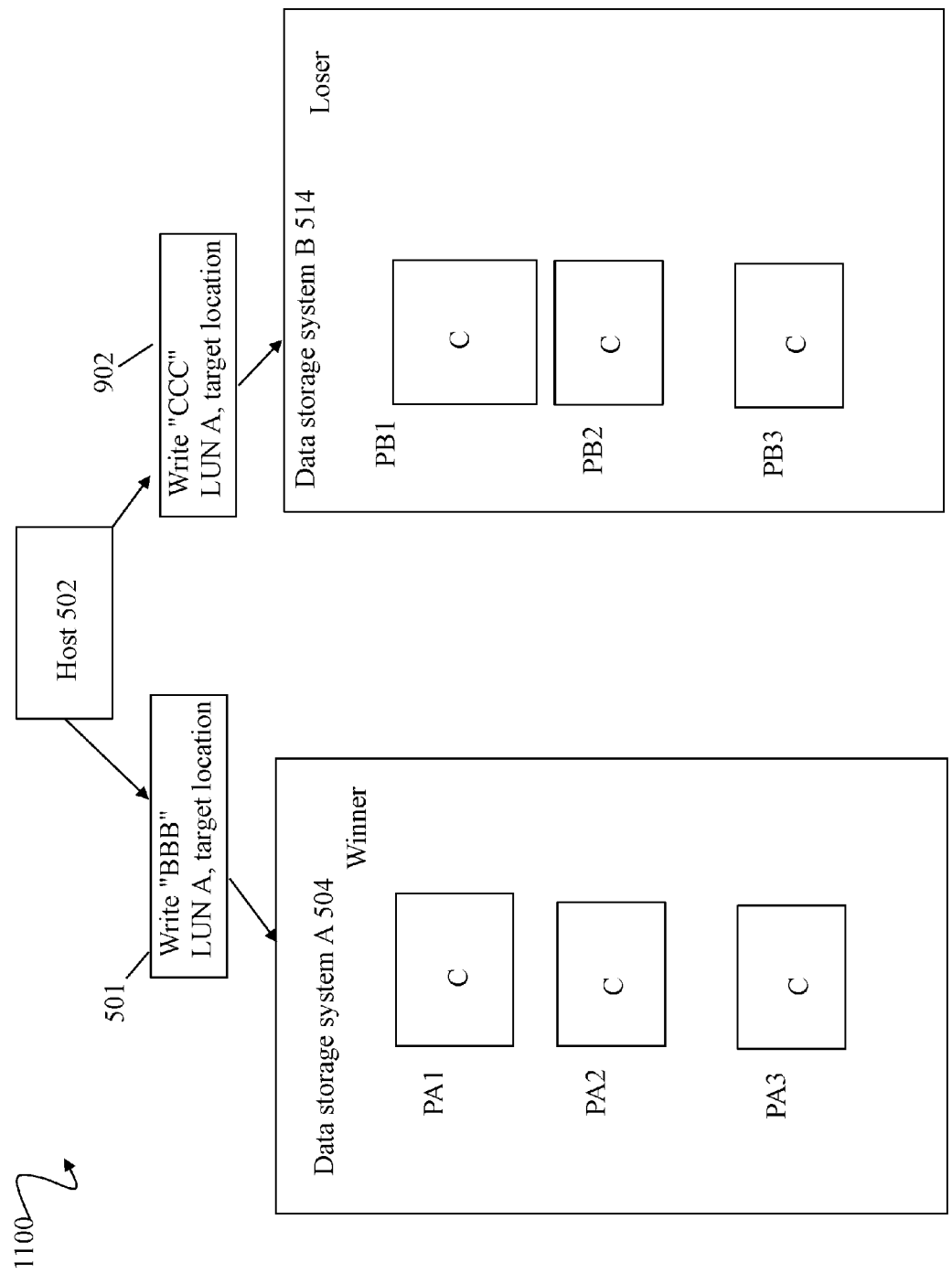

In this manner, deadlock may be detected and resolution processing performed to allow a selected one of the conflicting replication requests to proceed based on which of the data storage system is the winner. Assuming multi-page write processing continues and completes for 501 and 902 using the resolution processing as described in connection with FIGS. 10 and 12 to proceed when needed, FIG. 13 illustrates the state of the systems after completion of writes 501 and 902. As seen in the example 1100, the write data of 902 of the loser data storage system may be the final contents of LUN A, LBA 1-300 since write 902 is applied after 501 in connection with resolution processing.

With reference back to FIG. 10, if the deadlock is detected by the winner DS A where PB1 is locked and the loser DS B receives a replication request from winner DS A to replicate PA1 in corresponding cache page PB1 (mapped to the same data area and logical address LUN A, LBA 1-100 as PA1), the winning DS A may simply wait to acquire the lock on page PB1 since resolution processing as described herein will eventually result in the lock becoming shareable for cache page PB1 when the loser DS B 514 backs off and allows the conflicting replication request to replicate cache page PA1 to PB1 to proceed first prior to processing the replication request of the loser DS B to replicate cache page PB1 to PA1.

Figure 14:
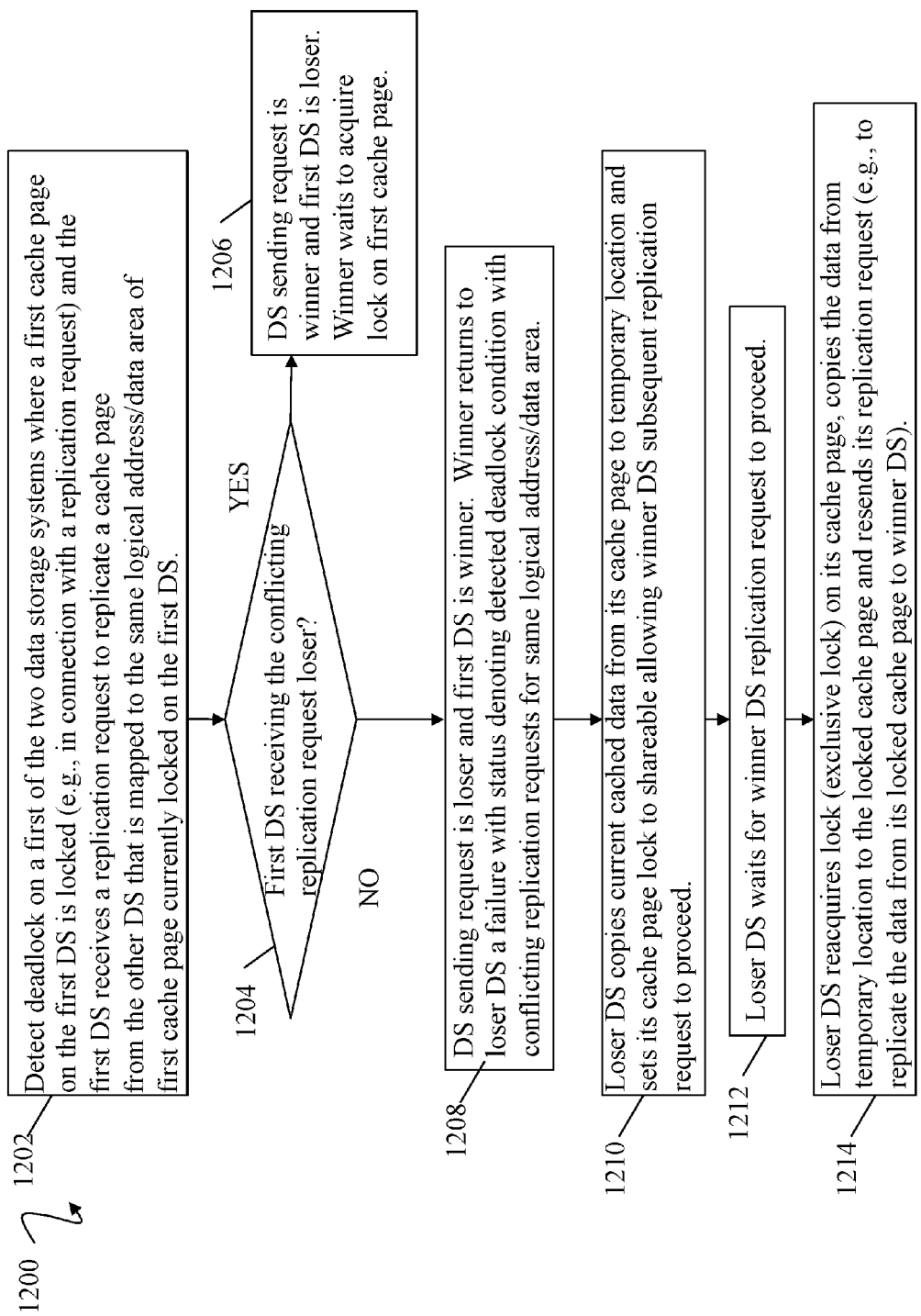

Referring to FIG. 14, shown is a flowchart of processing that may be performed in an embodiment in accordance with techniques herein. The flowchart 1200 summarizes processing steps as described above that may be performed to detect and resolve deadlock where processing of two concurrent multi-page writes is being performed as described herein. At step 1202, deadlock may be detected on a first of the two data storage systems where a first cache page on the first data storage system is locked (e.g., such as in connection with a replication request) and the first data storage system receives a replication request to replicate a cache page from the other data storage system where the cache page of the other data storage system that is mapped to the same logical address/data area of the first cache page currently locked on the first data storage system. At step 1204, a determination is made as to whether the first data storage system receiving the conflicting replication request is the loser. If step 1204 evaluates to yes (denoting the data storage system sending the replication request is the winner and the first data storage system receiving the replication request is the loser), control proceeds to step 1206. At step 1206, the winner data storage system waits to acquire the lock on the first cache page.

If step 1204 evaluates to no (denoting the data storage system sending the replication request is the loser and the first data storage system receiving the replication request is the winner), control proceeds to step 1208. At step 1208, the winner returns to the loser a failure message regarding the replication request sent by the loser in step 1202. The failure may also include a special status indicating the detected deadlock condition with conflicting replication requests for the same logical address or same data area. At step 1210, the loser copies current cached data from its cache page to a temporary location and sets its cache page lock to shareable allowing the winner's subsequent replication request to proceed. At step 1212, the loser waits for the winner's replication request to proceed (e.g., replication request to replicate cache page of data of the winner that is mapped to the same data area/logical address as the cache page now having the shareable lock set in step 1210). At step 1214, the loser reacquires the lock (shareable cache page lock set to exclusive lock) on its cache page, copies the data from temporary location to the locked cache page and resends its replication request (e.g., to replicate the data from its locked cache page to winner DS).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving, from a host, a first write at a first data storage system, wherein the first write is a request to write first data to a target location on a target device and the first data is stored in a first plurality of cache pages;
   performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page;

performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system, wherein the first plurality of cache pages have a sequential ordering and the second plurality of corresponding cache pages have the sequential ordering and wherein said second processing includes:

receiving a first replication request to synchronously replicate one of the first plurality of cache pages of the first data storage system to a corresponding cache page of the second plurality of cache pages of the second data storage system;

determining whether the one cache page is a first cache page of the sequential ordering; and if the one cache page is the first cache page of the sequential ordering, performing processing including locking said corresponding cache page, storing data from the one cache page in the corresponding cache page of the second plurality of cache pages, and returning an acknowledgement to the first data storage system regarding successful synchronous replication of the one cache page, wherein, if the one cache page is not the first cache page of the sequential ordering, performing third processing comprising:

locking said corresponding cache page;

determining whether a second cache page of the second plurality of cache pages on the second data storage system is locked, the second cache page having a position in the sequential ordering immediately prior to said one cache page in the sequential ordering; and if it is determined that the second cache page is locked, performing processing including unlocking the second cache page, storing data from the one cache page in the corresponding cache page of the second plurality of cache pages, and returning an acknowledgement to the first data storage system regarding successful synchronous replication of the one cache page.

2. The method of claim 1, further comprising:

returning an acknowledgment to the host regarding completion of the first write responsive to receiving the plurality of acknowledgements from the second data storage system.

3. The method of claim 1, wherein if the second cache page of the second plurality of cache pages is not locked, performing additional processing including:

unlocking said corresponding cache page, waiting for the second cache page to become locked, unlocking the second cache page, storing data from the one cache page in the corresponding cache page, and returning an acknowledgement to the first data storage system regarding successful synchronous replication of the one cache page.

4. The method of claim 3, further comprising:

determining whether the one cache page is a last cache page in the sequential ordering; and if it is determined that the one cache page is the last cache page in the sequential ordering, unlocking the corresponding cache page of the second data storage system.

5. The method of claim 1, wherein the first data storage system exposes a first device to a host over a first path between the host and the first data storage system, and the second data storage system exposes a second device to the host over a second path between the host and the second data storage system, the first device and the second device being configured as the target device.

6. The method of claim 5, wherein the host issues the first write over the first path and the host issues one or more other I/Os directed to the target device over the second path.

7. The method of claim 6, wherein the one or more other I/Os include at least one read directed to the target location of the target device.

8. The method of claim 6, wherein the one or more other I/Os include at least a second write directed to the target location of the target device, the second write writing second data spanning multiple cache pages, and wherein processing is performed to synchronously replicate the second data from the second data storage system to the first data storage system.

9. The method of claim 8, wherein the method includes:

performing deadlock detection processing that detects a first conflicting replication request to synchronously replicate a portion of the first data from the first data storage system to the second data storage system, and a second conflicting replication request to replicate a portion of the second data from the second data storage system to the first data storage system, said first data and said second data each mapping to a same location on the target device; and responsive to detecting the first conflicting replication request and the second conflicting replication request, performing resolution processing that selects one of the first conflicting replication request and the second conflicting replication request to proceed prior to the other of the first conflicting replication request and the second conflicting replication request.

10. The method of claim 9, further comprising:

processing the first conflicting replication request prior to the second conflicting replication request; and processing the second conflicting replication request after processing the first conflicting replication request.

11. A non-transitory computer readable medium comprising code stored thereon that, when executed, performs a method of processing I/O operations comprising:

receiving, from a host, a first write at a first data storage system, wherein the first write is a request to write first data to a target location on a target device and the first data is stored in a first plurality of cache pages;

performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page;

performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system, wherein the first plurality of cache pages have a sequential ordering and the second plurality of corresponding cache pages have the sequential ordering, and wherein said second processing includes:

receiving a first replication request to synchronously replicate one of the first plurality of cache pages of the first data storage system to a corresponding cache page of the second plurality of cache pages of the second data storage system;

determining whether the one cache page is a first cache page of the sequential ordering; and if the one cache page is the first cache page of the sequential ordering, performing processing including locking said corresponding cache page, storing data from the one cache page in the corresponding cache page of the second plurality of cache pages, and returning an acknowledgement to the first data storage system regarding successful synchronous replication of the one cache page, and, wherein, if the one cache page is not the first cache page of the sequential ordering, performing third processing comprising:

locking said corresponding cache page;

determining whether a second cache page of the second plurality of cache pages on the second data storage system is locked, the second cache page having a position in the sequential ordering immediately prior to said one cache page in the sequential ordering; and if it is determined that the second cache page is locked, performing processing including unlocking the second cache page, storing data from the one cache page in the corresponding cache page of the second plurality of cache pages, and returning an acknowledgement to the first data storage system regarding successful synchronous replication of the one cache page.

12. The non-transitory computer readable medium of claim 11, wherein the method further comprises:

returning an acknowledgment to the host regarding completion of the first write responsive to receiving the plurality of acknowledgements from the second data storage system.

13. The non-transitory computer readable medium of claim 11, wherein if the second cache page of the second plurality of cache pages is not locked, performing additional processing including:

unlocking said corresponding cache page, waiting for the second cache page to become locked, unlocking the second cache page, storing data from the one cache page in the corresponding cache page, and returning an acknowledgement to the first data storage system regarding successful synchronous replication of the one cache page.

14. A system comprising:

a processor; and a memory comprising code stored thereon that, when executed, performs a method of processing I/O operations comprising:

receiving, from a host, a first write at a first data storage system, wherein the first write is a request to write first data to a target location on a target device and the first data is stored in a first plurality of cache pages;

performing first processing to synchronously replicate the first data of the first plurality of cache pages from the first data storage system to a second data storage system, wherein said first processing includes acquiring a lock on each of the first plurality of cache pages and not releasing said lock until an acknowledgement is received from the second data storage system regarding successful synchronous replication of said each cache page;

performing second processing on the second data storage system to store the first data of the first plurality of cache pages in a second plurality of corresponding cache pages on the second data storage system; and receiving at the first data storage system a plurality of acknowledgements indicating successful synchronous replication of the first plurality of cache pages to the second data storage system, wherein the first plurality of cache pages have a sequential ordering and the second plurality of corresponding cache pages have the sequential ordering and wherein said second processing includes:

receiving a first replication request to synchronously replicate one of the first plurality of cache pages of the first data storage system to a corresponding cache page of the second plurality of cache pages of the second data storage system;

determining whether the one cache page is a first cache page of the sequential ordering; and if the one cache page is the first cache page of the sequential ordering, performing processing including locking said corresponding cache page, storing data from the one cache page in the corresponding cache page of the second plurality of cache pages, and returning an acknowledgement to the first data storage system regarding successful synchronous replication of the one cache page, wherein, if the one cache page is not the first cache page of the sequential ordering, performing third processing comprising:

locking said corresponding cache page;

determining whether a second cache page of the second plurality of cache pages on the second data storage system is locked, the second cache page having a position in the sequential ordering immediately prior to said one cache page in the sequential ordering; and if it is determined that the second cache page is locked, performing processing including unlocking the second cache page, storing data from the one cache page in the corresponding cache page of the second plurality of cache pages, and returning an acknowledgement to the first data storage system regarding successful synchronous replication of the one cache page.

* * * * *